(12) United States Patent
Heeter et al.

(10) Patent No.: US 11,946,379 B2
(45) Date of Patent: Apr. 2, 2024

(54) TURBINE ENGINE FAN CASE WITH MANIFOLDED TIP INJECTION AIR RECIRCULATION PASSAGES

(71) Applicant: Rolls-Royce North American Technologies Inc., Indianapolis, IN (US)

(72) Inventors: Robert W. Heeter, Noblesville, IN (US); Daniel E. Molnar, Jr., Lebanon, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 9 days.

(21) Appl. No.: 17/560,230

(22) Filed: Dec. 22, 2021

(65) Prior Publication Data
US 2023/0193778 A1 Jun. 22, 2023

(51) Int. Cl.
| | | |
|---|---|---|
| F01D 21/04 | (2006.01) | |
| F01D 25/24 | (2006.01) | |
| F02K 3/06 | (2006.01) | |

(52) U.S. Cl.
CPC ........... *F01D 21/045* (2013.01); *F01D 25/24* (2013.01); *F02K 3/06* (2013.01); *F05D 2220/36* (2013.01); *F05D 2240/14* (2013.01)

(58) Field of Classification Search
CPC ... F01D 25/24; F02K 3/02; F02K 3/06; F02C 7/045
See application file for complete search history.

(56) References Cited

U.S. PATENT DOCUMENTS

| | | | |
|---|---|---|---|
| 3,572,960 A * | 3/1971 | McBride | ............... F04D 29/684 |
| | | | 415/209.1 |
| 5,308,225 A * | 5/1994 | Koff | ......................... F01D 11/08 |
| | | | 415/58.7 |
| 5,431,533 A * | 7/1995 | Hobbs | ..................... F01D 11/08 |
| | | | 415/58.7 |
| 5,474,417 A | 12/1995 | Privett et al. | |
| 5,607,284 A | 3/1997 | Byrne et al. | |
| 6,289,665 B1 | 9/2001 | Saiz | |
| 6,585,479 B2 | 7/2003 | Torrance | |
| 7,077,623 B2 | 7/2006 | Guemmer | |
| 7,631,483 B2 | 12/2009 | Mani et al. | |
| 7,811,049 B2 | 10/2010 | Xu | |
| 7,870,721 B2 | 1/2011 | Winter | |
| 7,967,556 B2 | 6/2011 | Guemmer | |
| 8,043,046 B2 | 10/2011 | Guemmer | |
| 8,082,726 B2 * | 12/2011 | Cloft | ......................... F02K 3/06 |
| | | | 60/785 |
| 8,152,444 B2 | 4/2012 | Guemmer | |
| 8,152,445 B2 | 4/2012 | Guemmer | |
| 8,152,467 B2 | 4/2012 | Guemmer | |

(Continued)

*Primary Examiner* — Woody A Lee, Jr.
*Assistant Examiner* — Cameron A Corday
(74) *Attorney, Agent, or Firm* — Barnes & Thornburg LLP

(57) ABSTRACT

A fan case assembly adapted for use with a gas turbine engine includes a fan track liner and an annular case. The fan track liner extends circumferentially at least partway about a central axis of the gas turbine engine. The annular case is configured to support the fan track liner at a radial position relative to the central axis. The fan case assembly further includes an air recirculation duct configured to redirect air around the fan track liner.

12 Claims, 13 Drawing Sheets

(56) References Cited

U.S. PATENT DOCUMENTS

| | | |
|---|---|---|
| 8,182,209 B2 | 5/2012 | Brault et al. |
| 8,192,148 B2 | 6/2012 | Guemmer |
| 8,234,869 B2 | 8/2012 | Tuan |
| 8,262,340 B2 | 9/2012 | Guemmer |
| 8,262,351 B2 | 9/2012 | Clemen et al. |
| 8,403,630 B2 | 3/2013 | Guemmer |
| 8,683,811 B2 | 4/2014 | Clemen et al. |
| 8,882,443 B2 | 11/2014 | Agneray et al. |
| 9,074,605 B2 | 7/2015 | Bouru et al. |
| 9,115,594 B2 | 8/2015 | Krautheim |
| 9,664,204 B2 | 5/2017 | Guemmer |
| 10,006,467 B2 | 6/2018 | Guemmer |
| 10,041,500 B2 | 8/2018 | Streit |
| 10,145,387 B2 | 12/2018 | Knight et al. |
| 2005/0226717 A1* | 10/2005 | Xu ................... F04D 27/0238 415/58.5 |
| 2017/0175676 A1 | 6/2017 | Murooka et al. |
| 2018/0171871 A1 | 6/2018 | Duong et al. |
| 2020/0386107 A1* | 12/2020 | Hoisington ............... F01D 9/04 |

* cited by examiner

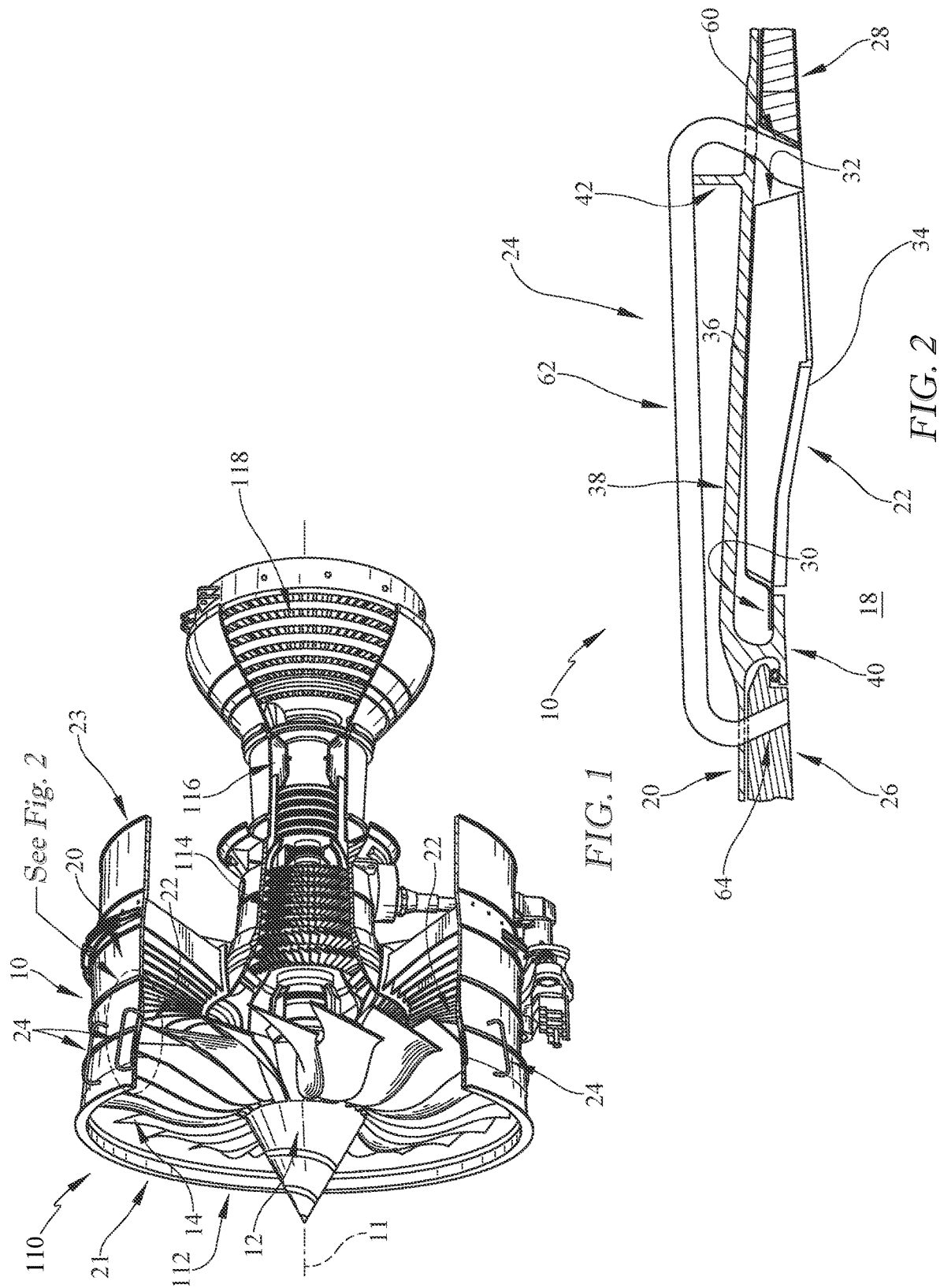

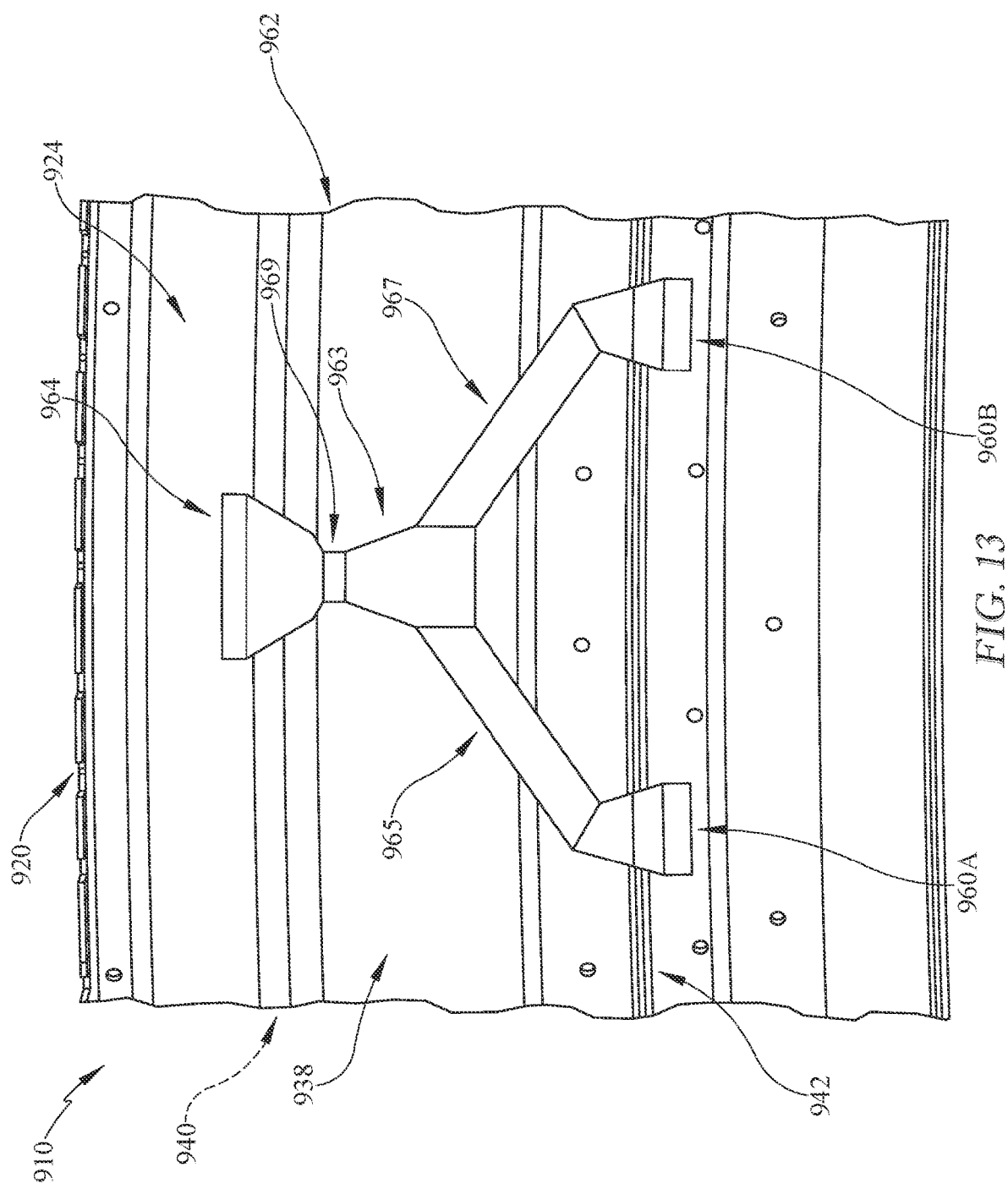

TURBINE ENGINE FAN CASE WITH MANIFOLDED TIP INJECTION AIR RECIRCULATION PASSAGES

STATEMENT REGARDING FEDERALLY SPONSORED RESEARCH OR DEVELOPMENT

Embodiments of the present disclosure were made with government support under Contract No. FA865019F2078. The government may have certain rights.

FIELD OF THE DISCLOSURE

The present disclosure relates generally to gas turbine engines, and more specifically to fan containment cases for gas turbine engines.

BACKGROUND

Gas turbine engines used in aircraft often include a fan assembly that is driven by an engine core to push air through the engine and provide thrust for the aircraft. A typical fan assembly includes a fan rotor having blades and a fan case that extends around the blades of the fan rotor. During operation, the fan blades of the fan rotor are rotated to push air through the engine. The fan case both guides the air pushed by the fan blades and provides a protective band that blocks fan blades from escaping out of the fan assembly in case of a blade-off event in which a fan blade is released from the fan rotor.

Fan cases sometimes include metallic shrouds and liners positioned between the metallic shroud and the fan blades. Liners may be coupled to metallic shrouds by hanger features that extend from the metallic shrouds, by adhesives that provide a permanent bond to the metallic shrouds, or by fasteners/through bolts bolted directly to the case. Fan cases may also provide containment functions in case of a blade-off event. The containment function of the fan cases may make it difficult to incorporate other features into the fan case, while still maintaining the structural integrity of the fan case system.

SUMMARY

The present disclosure may comprise one or more of the following features and combinations thereof.

A fan case assembly adapted for use with a gas turbine engine may include a fan track liner, an annular case, and an air recirculation duct. The fan track liner may extend circumferentially at least partway about a central axis of the gas turbine engine. The annular case may be coupled with the fan track liner to support the fan track liner radially in the gas turbine engine. The air recirculation duct may be configured to direct a portion of gases flowing through a gas path of the gas turbine engine from an aft end of the fan track liner into the gas path axially forward of a forward end of the fan track liner.

In some embodiments, the fan track liner may include the forward end, the aft end, and an inner radial surface. The aft end may be spaced apart axially from the forward end. The inner radial surface may extend between the forward end and the aft end to define the gas path of the gas turbine engine.

In some embodiments, the air recirculation duct may include extraction ports spaced apart circumferentially about the central axis, a first injection port, and a manifold. The extraction ports and injection ports may be in fluid communication with the gas path of the gas turbine engine. Each of the extraction ports may extend radially through the annular case at a location axially aft of the aft end of the fan track liner. The first injection port may extend radially through the annular case at a location axially forward of the forward end of the fan track liner. The manifold may be located radially outward of the annular case.

In some embodiments, the manifold may be in fluid communication with the extraction ports and the first injection port. The manifold may be in fluid communication with the extraction ports and the first injection port so that the portion of gases from the aft end of the fan track liner from the extraction ports is directed to the first injection port and into the gas path axially forward of the fan track liner.

In some embodiments, the air recirculation duct may include a second injection port. The second injection port may be spaced apart circumferentially from the first injection port. The manifold may be in fluid communication with the extraction ports, the first injection port, and the second injection port so that the portion of gases from the aft end of the fan track liner from the extraction ports is directed to both the first injection port and the second injection port.

In some embodiments, the first injection port may be circumferentially aligned with a first extraction port. The second injection port may be circumferentially aligned with a second extraction port. The manifold may extend circumferentially at least partway about the axis.

In some embodiments, the manifold may include a first conduit, a second conduit, and an interconnecting conduit. The first conduit may extend axially between the first injection port and the first extraction port. The second conduit may extend axially between the second injection port and the second extraction port. The interconnecting conduit may extend circumferentially at least partway between the first conduit and the second conduit.

In some embodiments, the extraction ports may include a first extraction port and a second extraction port. The second extraction port may be spaced apart circumferentially from the first extraction port. The first injection port may be located circumferentially between the first extraction port and the second extraction port.

In some embodiments, the manifold may include a central duct, a first conduit, a second conduit, and a third conduit. The central duct may be arranged axially between the extraction ports and the first injection port. The first conduit may extend axially forward from the first extraction port to the central duct. The second conduit may extend axially forward from the second extraction port to the central duct. The third conduit may extend axially aft from the first injection port to the central duct.

In some embodiments, the annular case may include an outer wall, a hook, and a flange. The outer wall may extend circumferentially around the central axis of the gas turbine engine. The hook may extend radially inward from the outer wall. The flange may extend radially outward from the outer wall axially aft of the hook.

In some embodiments, the extraction ports of the air recirculation duct may extend through the outer wall axially aft of the flange. In some embodiments, the extraction ports of the air recirculation duct may extend through the outer wall axially forward of the flange.

In some embodiments, the manifold of the air recirculation duct may be located radially outward of the flange of the annular case. The flange of the annular case may engage the manifold to support the air recirculation duct relative to the annular case.

In some embodiments, the fan case assembly may further include a first valve and a second valve. The first valve may be coupled to a first extraction port of the air recirculation duct. The second valve may be coupled to a second extraction port of the air recirculation duct. The first and second valves may be configured to vary a flow of gases through the first and second extraction ports.

According to another aspect of the present disclosure, a fan case assembly adapted for use in a gas turbine engine may include a fan track liner, an annular case, and an air recirculation duct. The fan track liner may extend circumferentially at least partway about a central axis to define a portion of a gas path. The fan track liner may include a forward end and an aft end spaced apart axially from the forward end. The annular case may be coupled with the fan track liner.

In some embodiments, the air recirculation duct may include extraction ports, a first injection port, and a manifold. The extraction ports and the first injection port may be in fluid communication with the gas path of the gas turbine engine. The extraction ports may be spaced circumferentially about the central axis. Each of the extraction ports may extend radially through the annular case near the aft end of the fan track liner. The first injection port may extend radially through the annular case near the forward end of the fan track liner. The manifold may be in fluid communication with the extraction ports and the first injection port.

In some embodiments, the manifold may extend from the extraction ports to the first injection port. The manifold may be located radially outward of the annular case.

In some embodiments, the air recirculation duct may include a second injection port. The second injection port may be spaced apart circumferentially from the first injection port. The manifold may be in fluid communication with the extraction ports, the first injection port, and the second injection port.

In some embodiments, the first injection port may be circumferentially aligned with a first extraction port. The second injection port may be circumferentially aligned with a second extraction port. The manifold may extend circumferentially about the axis.

In some embodiments, the manifold may include a first conduit, a second conduit, and an interconnecting conduit. The first conduit may extend axially between the first injection port and the first extraction port. The second conduit may extend axially between the second injection port and the second extraction port. The interconnecting conduit may extend circumferentially at least partway between the first conduit and the second conduit.

In some embodiments, the first injection port may be located circumferentially between a first extraction port and a second extraction port. The second extraction port may be spaced apart circumferentially from the first extraction port.

In some embodiments, the manifold may include a central duct, a first conduit, a second conduit, and a third conduit. The first conduit may extend axially forward from the first extraction port to the central duct. The second conduit may extend axially forward from the second extraction port to the central duct. The third conduit may extend axially aft from the first injection port to the central duct.

In some embodiments, the annular case may include an outer wall, a hook, and a flange. The outer wall may extend circumferentially around the central axis of the gas turbine engine. The hook may extend radially inward from the outer wall. The flange may extend radially outward from the outer wall axially aft of the hook. In some embodiments, the extraction ports of the air recirculation duct may extend through the outer wall axially aft of the flange.

According to another aspect of the present disclosure, a method may include providing an annular case, a fan track liner, and an air recirculation duct. The annular case may extend around a central axis. The fan track liner may extend circumferentially at least partway about the central axis. The air recirculation duct may include a first extraction port, a second extraction port, a first injection port, and a manifold that fluidly connects the extraction ports and the first injection port.

In some embodiments, the method may further include coupling the fan track liner to the annular case, extending the first extraction port radially through the annular case axially aft of an aft end of the fan track liner, extending the second extraction port radially through the annular case axially aft of the aft end of the fan track liner at a location spaced apart circumferentially from the first extraction port, and extending the first injection port radially through the annular case axially forward of a forward end of the fan track liner. In this way, the manifold may be located radially outward of the annular case.

In some embodiments, the air recirculation duct may include a second injection port. The manifold may be in fluid communication with the extraction ports, the first injection port, and the second injection port.

In some embodiments, the method may further include extending the second injection port radially through the annular case axially forward of the forward end of the fan track liner at a location spaced apart circumferentially from the first injection port. In some embodiments, the first extraction port may be spaced apart circumferentially from the second extraction port and the first injection port may be located circumferentially between the first extraction port and the second extraction port.

These and other features of the present disclosure will become more apparent from the following description of the illustrative embodiments.

BRIEF DESCRIPTION OF THE DRAWINGS

FIG. 1 is a cutaway view of a gas turbine engine that includes a fan, a compressor, a combustor, and a turbine, the fan including a fan rotor configured to rotate about an axis of the engine and a fan case assembly that surrounds fan blades included in the fan rotor and showing that the fan case assembly includes an annular case, a fan track liner which may be formed by a number of liner segments positioned around the fan blades, and a plurality of air recirculation ducts located radially outward of the annular case;

FIG. 2 is an enlarged view of the fan case assembly of FIG. 1 showing the air recirculation duct included in the fan case assembly is configured to direct a portion of gases flowing through the gas path of the gas turbine engine from an aft end of the fan track liner into the gas path axially forward of a forward end of the fan track liner;

FIG. 3 is a section view of the annular case included in the fan case assembly of FIG. 1 showing the annular case includes an outer wall that extends circumferentially around the axis of the gas turbine engine, a hook that extends radially inward from the outer wall to support the forward end of the fan track liner, and a flange that extends radially outward from the outer wall axially aft of the hook, and further showing zones on the annular case that the air recirculation duct may extend through;

FIG. 13 is an elevation view of another embodiment of a fan case assembly for the gas turbine engine of FIG. 1 looking radially inward from radially outward of the fan case assembly showing an air recirculation duct included in the fan case assembly includes extraction ports spaced apart circumferentially from each other, an injection port located circumferentially between the extraction ports, and a manifold that is in fluid communication between the extraction ports and the injection port to feed the air directed out of the gas path by the extraction ports to the single injection port.

DETAILED DESCRIPTION OF THE DRAWINGS

Figure 3:
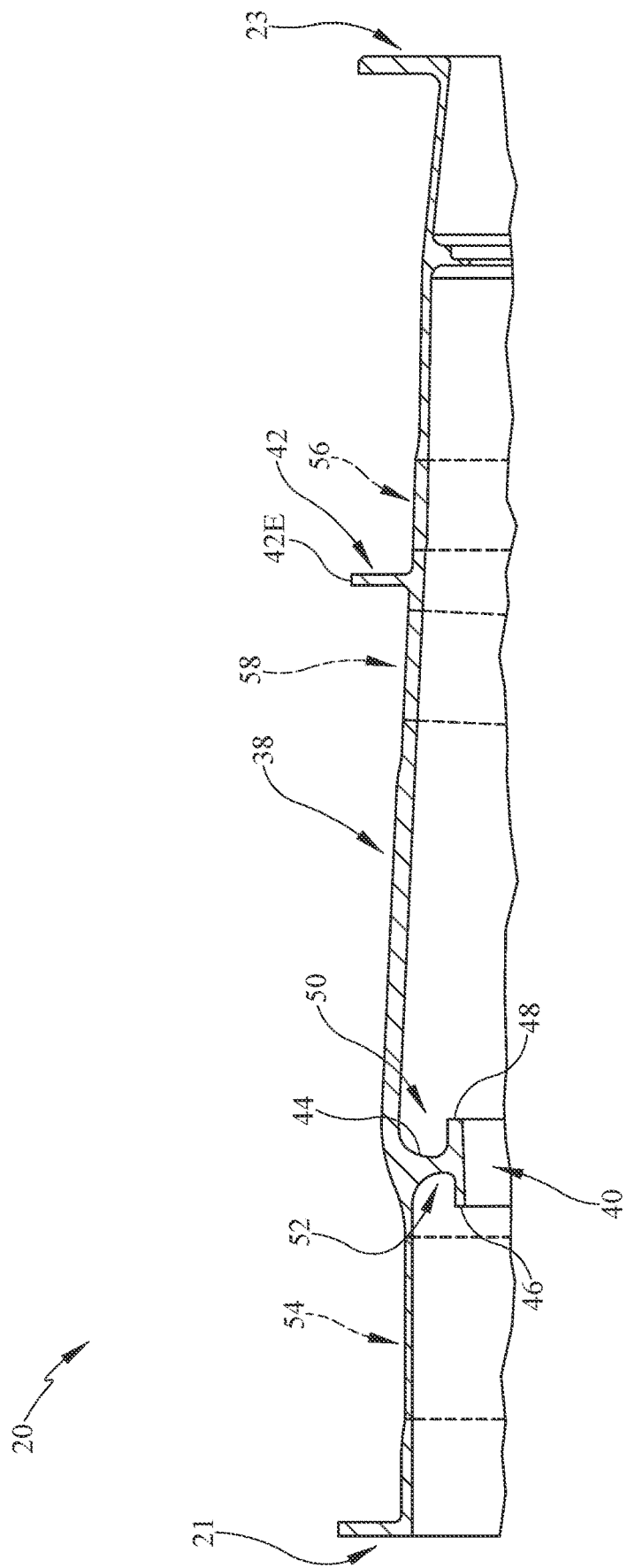

For the purposes of promoting an understanding of the principles of the disclosure, reference will now be made to a number of illustrative embodiments illustrated in the drawings and specific language will be used to describe the same.

A fan case assembly 10 is adapted for use in a gas turbine engine 110 as shown in FIG. 1. The gas turbine engine 110 includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about an axis 11 of the gas turbine engine 110 and drive the compressor 114 and the fan 112.

The fan 112 includes a fan rotor 12 and a fan case assembly 10 as shown in FIG. 1. The fan rotor 12 has a number of fan blades 14. The fan case assembly 10 extends circumferentially around the fan blades 14 of the fan rotor 12 such that the fan case assembly 10 is aligned axially with the fan blades 14.

The fan case assembly 10 includes, among other components, an annular case 20, a fan track liner 22, and an air recirculation duct 24 as shown in FIGS. 1-4. The annular case 20 is configured to support the fan track liner 22 at a radial position relative to a central axis 11 of the gas turbine engine 110. The fan track liner 22 extends circumferentially at least partway about the central axis 11 of the gas turbine engine 110 and defines a portion of a gas path 18 of the gas turbine engine 110. The air recirculation duct 24 is configured to direct a portion of gases flowing through the gas path 18 of the gas turbine engine 110 from an aft end 32 of the fan track liner 22 into the gas path 18 axially forward of a forward end 30 of the fan track liner 22.

Figure 4:
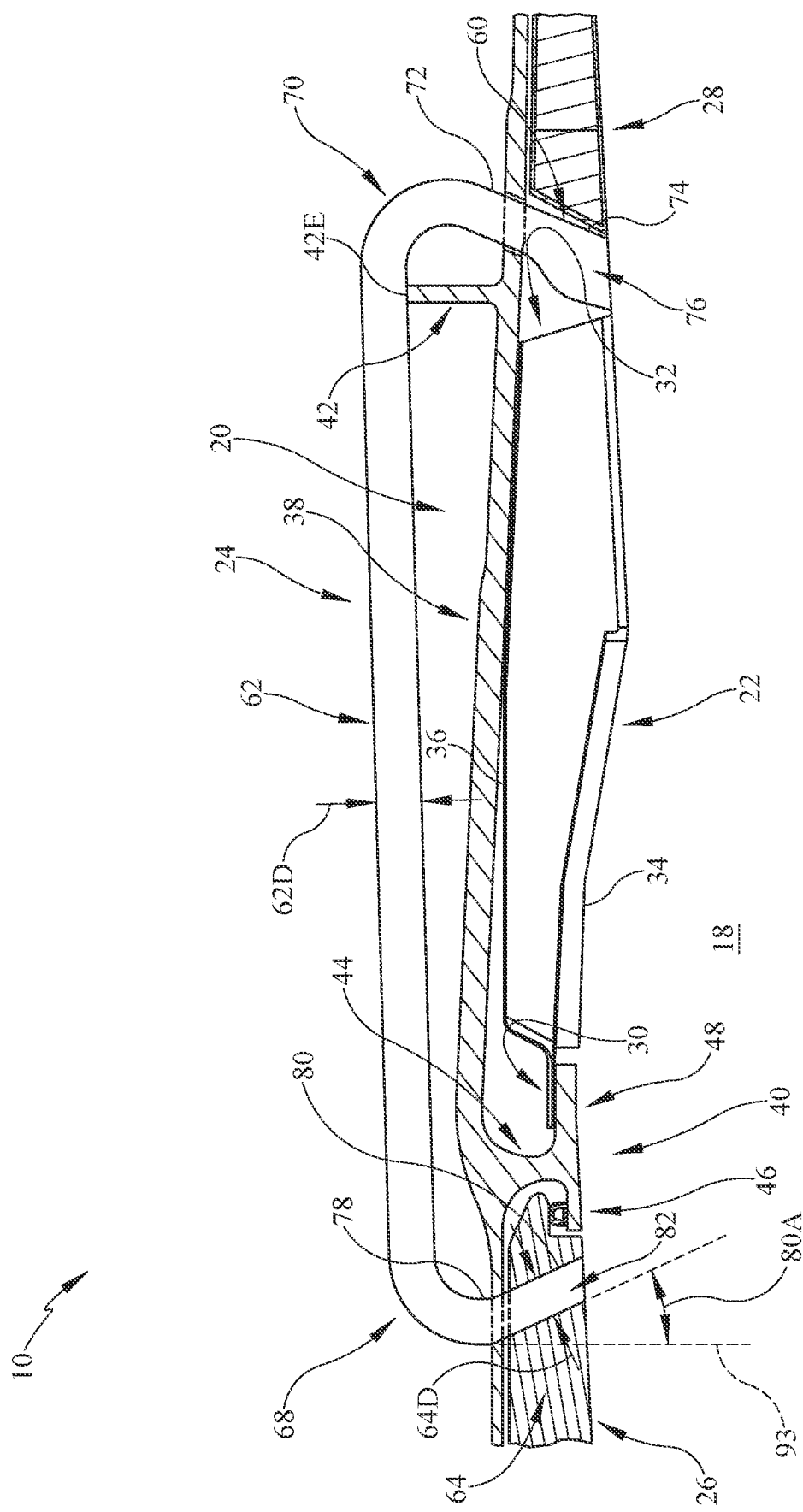
FIG. 4 is an enlarged view of FIG. 2 showing the air recirculation duct includes an extraction port in fluid communication with the gas path that extends radially through the outer wall at a location axially aft of the aft end of the fan track liner, an injection port in fluid communication with the gas path that extends radially through the outer wall at a location axially forward of the hook of the annular case, and a conduit that extends between and interconnects the extraction port and the injection port at a location radially outward of the outer wall, and further showing the extraction port extends through the outer wall axially aft of the flange so that the flange supports the conduit.

The air recirculation duct 24 includes an extraction port 60, a conduit 62, and an injection port 64 as shown in FIGS. 2 and 4. In some embodiments, the ports 60, 64 and conduit 62 are integrally formed as a single, one-piece component. In other embodiments, the ports 60, 64 and conduit 62 are individual or even several components each that are coupled together. Both the extraction port 60 and the injection port 64 are in fluid communication with the gas path 18 of the gas turbine engine 110, while the conduit 62 is in fluid communication with the extraction and injection ports 60, 64. The extraction port 60 extends radially through an outer wall 38 of the case 20 at a location axially aft of the aft end 32 of the fan track liner 22. The conduit 62 extends axially forward from the extraction port 60 toward the forward end 30 of the fan track liner 22 to the injection port 64. The injection port 64 extends radially inward from the conduit 62 through the outer wall 38 of the case 20 at a location axially forward of the forward end 30 of the fan track liner 22.

The conduit 62 is located radially outward of the outer wall 38 of the annular case 20 as shown in FIGS. 2 and 4. The extraction port 60 and the injection port 62 extend radially inward through the outer wall 38 of the case 20 and open into the gas path 18. In this way, a portion of gases flowing through the gas path 18 is directed from the aft end 32 of the fan track liner 22 radially outward outside of the case 20, axially forward toward the forward end 30 of the liner 22, and radially inward back into the gas path 18 axially forward of the forward end 30 of the fan track liner 22.

Figure 10:
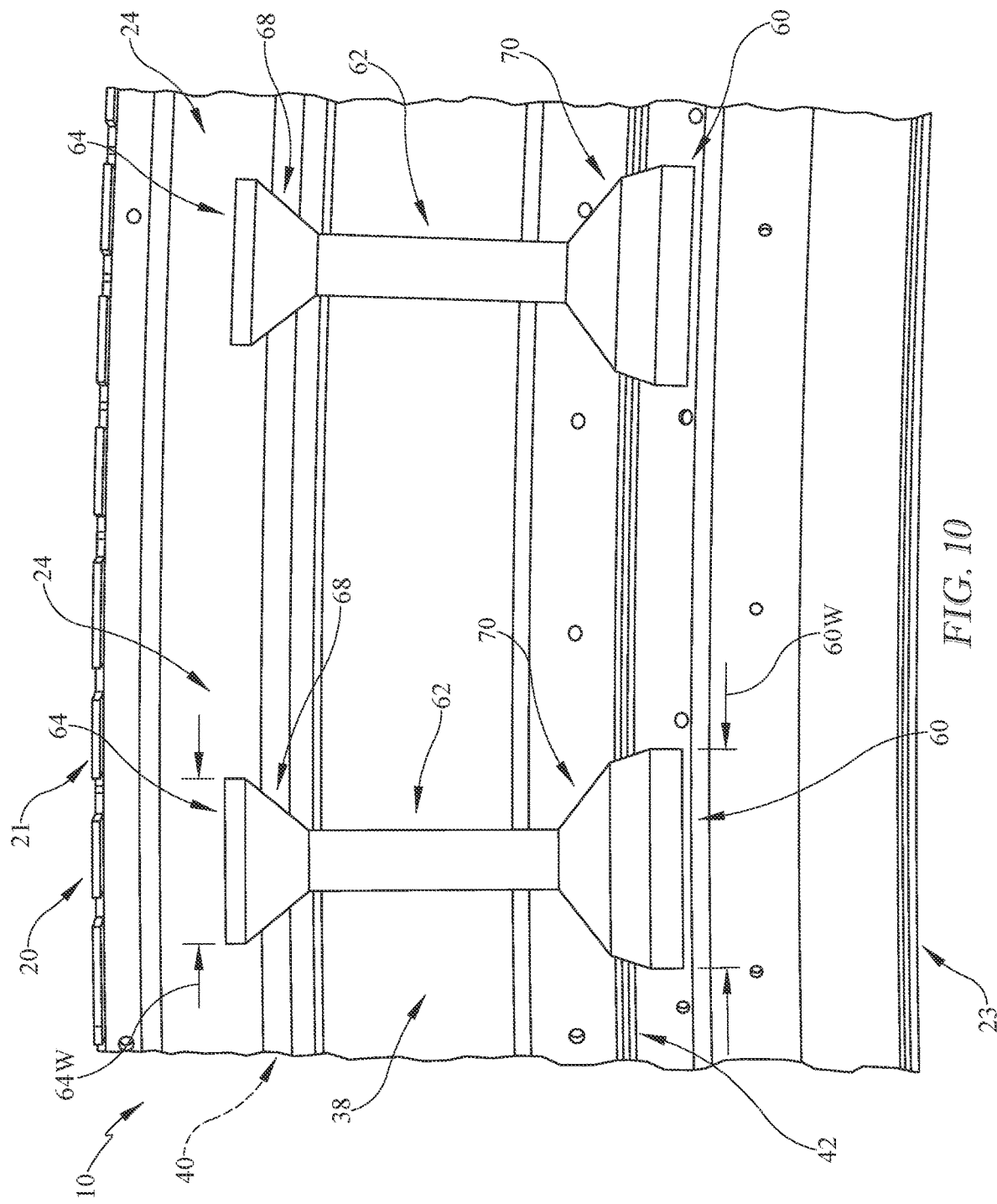
FIG. 10 is an elevation of the view of the fan case assembly of FIG. 2 looking radially inward from radially outward of the fan case assembly showing the air recirculation duct only extends axially such that the extraction port is circumferentially aligned with the injection port.

In the illustrative embodiment, the fan case assembly 10 includes a plurality of air recirculation ducts 24 as shown in FIGS. 1 and 10. The air ducts 24 are spaced apart circumferentially about the axis 11. The number of air recirculation ducts 24 may depend on the size of the engine 110 or on the stall margin improvement the engine 110 may use. If the engine 110 has need for a greater stall margin improvement, the number of air recirculation ducts 24 may be increased and vice versa.

In the illustrative embodiment, the conduit 62 solely extends axially between the extraction and injection ports 60, 64 as shown in FIG. 10. In FIG. 10, the air recirculation duct 24 is shown from radially outward of the case 20 looking radially inward. In the illustrative embodiment, the extraction port 60 is circumferentially aligned with the injection port 64 so that the conduit 62 only extends in the axial direction relative to the central axis 11 of the gas turbine engine 10.

Turning again to the fan case assembly 10, the fan case assembly 10 includes the annular case 20, the fan track liner 22, the air recirculation ducts 24, and acoustic panels 26, 28 as shown in FIGS. 2 and 4. The fan track liner 22 is formed by a number of liner segments 22 in the illustrative embodiment. The acoustic panels 26, 28 are located forward and aft of the fan track liner 22.

Each liner segment 22 includes a forward end 30, an aft end 32 spaced apart axially from the forward end 30, and inner and outer radial surfaces 34, 36 as shown in FIGS. 2 and 4. The inner and outer radial surfaces 34, 36 extend between the forward end 30 and the aft end 32. The inner radial surface 34 defines a portion of the gas path 18 of the gas turbine engine 110. The acoustic panels 26, 28 define portions of the gas path 18 of the gas turbine engine 110 axially forward and aft of the fan track liner 22 as shown in FIGS. 2 and 4.

The liner segments 22 and the acoustic panels 26, 28 are coupled to the annular case 20 as shown in FIG. 4. The forward acoustic panel 26 is coupled to the annular case 20 axially forward of the liner 22. The aft acoustic panel 28 is coupled to the annular case 20 axially aft of the liner 22.

The annular case 20 includes the outer wall 38, a hook 40, and a flange 42 as shown in FIGS. 2-4A. The outer wall 38 extends circumferentially around the central axis 11 of the gas turbine engine 110. The hook 40 extends radially inward from the outer wall 38 to support the forward end 30 of the fan track liner 22. The flange 42 extends radially outward from the outer wall 38 axially aft of the hook 40. In the illustrative embodiment, the fan track liner 22 is coupled to the outer wall 38 near the aft end 32 of the fan track liner 22 with a fastener to support the aft end 32 of the fan track liner 22.

In the illustrative embodiment, the annular case 20 extends between a forward end 21 and an aft end 23 as shown in FIGS. 1, 3, and 10. The aft end 23 is spaced apart axially from the forward end 21.

The outer wall 38 of the case 20 has zones 54, 56, 58 that the air recirculation duct 24 can extend through without significantly compromising the structural integrity of the annular case 20 as shown in FIG. 3. The first zone 54 is located axially forward of the hook 40 of the case 20. The second zone 56 is located axially aft of the flange 42 of the case 20. The third zone 58 is located axially forward of the flange 42 of the case 20. The injection port 64 may extend through the outer wall 38 of the case 20 in the first zone 54, while the extraction port 60 may extend through the outer wall 38 of the case 20 in either the second zone 56 or the third zone 58. In the illustrative embodiment, the extraction port 60 extends through the outer wall 38 of the case 20 in the second zone 56.

In other embodiments, the liner 22 may be bolted to the annular case 20 without the hook 40. In other embodiments, the liner 22 may be coupled to the annular case 20 with adhesive.

The hook 40 includes a radially-extending portion 44, a forward flange 46, and an aft flange 48 as shown in FIGS. 3 and 4. The radially-extending portion 44 extends radially inward form the outer wall 38. The forward flange 46 extends axially forward away from the radially-extending portion 44 at a location radially spaced apart from the outer wall 38 to form a first axially opening channel 50 as shown in FIG. 3. The aft flange 48 extends axially aft away from the radially-extending portion 44 at a location radially spaced apart from the outer wall 38 to form a second axially opening channel 52 as shown in FIG. 3.

The forward flange 46 engages the forward acoustic panel 26 to support the forward acoustic panel 26, while the aft flange 48 engages the fan track liner 22 to support the fan track liner 22 as shown in FIG. 4. The acoustic panel 26 extends into the first axially opening channel 52. The forward end 30 of the fan track liner 22 extends into the second axially opening channel 50.

In the illustrative embodiment, the injection port 64 extends through the outer wall 38 of the case 20 axially forward of the forward flange 46 of the hook 40 and the extraction port 60 extends through the outer wall 38 axially aft of the flange 42 as shown in FIGS. 2 and 4. The conduit 62 is located radially outward of the flange 42 of the annular case 20. A terminal end 42E of the flange 42 of the annular case 20 engages the conduit 62 to support the air recirculation duct 24 relative to the annular case 20. The conduit 62 may be couple to the flange 42 in some embodiments to block the air recirculation duct 24 from moving relative to the case 20.

The conduit 62 extends between a forward end 68 and an aft end 70 as shown in FIG. 4. The extraction port 60 extends radially inward and axially forward from the aft end 70 of the conduit 62 such that the aft end 70 forms a bend or curve. The injection port 62 extends radially inward and axially aft from the forward end 68 of the conduit 62 such that the forward end 68 forms a bend or curve.

Figure 4A:
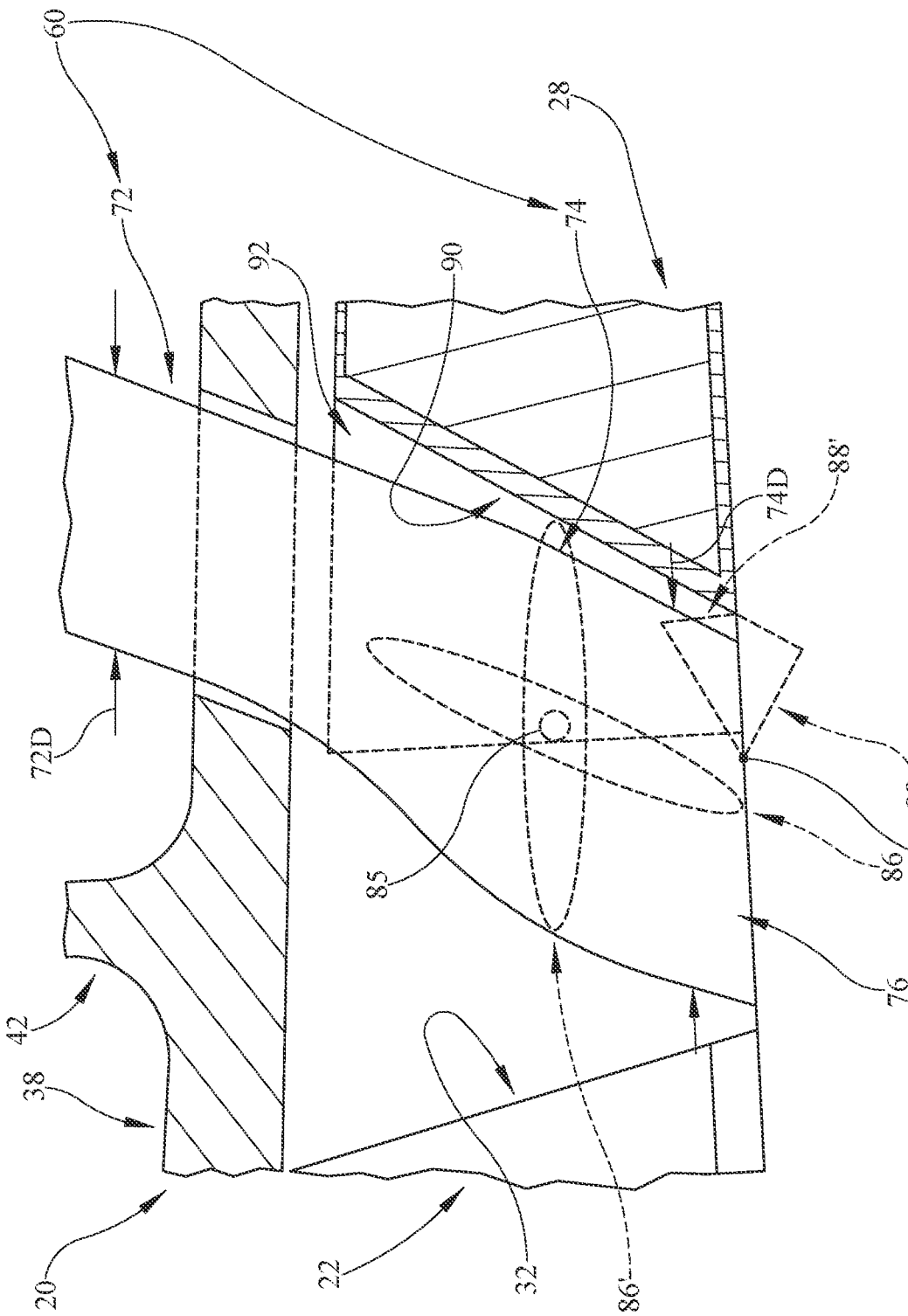
FIG. 4A is a detail view of FIG. 4 showing the extraction port with a valve coupled to an opening end of the extraction port that is configured to vary a flow of gases through the extraction port to control the flow of gases through the air recirculation duct.

The extraction port 60 has a first section 72 that extends from the conduit 62 and an opening end 74 that extends from the first section 72 and opens into the gas path 18 as shown in FIGS. 4 and 4A. The opening end 74 is located between the aft end 32 of the liner 22 and a forward end 90 of the acoustic panel 28. The first section 72 extends through the outer wall 38 of the case 20 axially aft of the flange 42, while the opening end 74 is axially aligned with the flange 42 radially inward of the outer wall 38 of the case 20.

In the illustrative embodiment, the opening end 74 extends through a portion of the acoustic liner 28 as shown in FIG. 4A. The acoustic liner 28 has a notch 92 in the forward end 90 of the acoustic panel 28 for the opening end to extend through.

In the illustrative embodiment, the first section 72 of the extraction port 60 has a first cross-sectional area 72D, while the opening end 74 has a second cross-sectional area 74D as shown in FIG. 4A. The second area 74D is greater than the first area 72D.

In some embodiments, the fan case assembly 10 may further include a valve 86 as suggested in FIG. 4A. The valve 86 may be coupled to the opening end 74 of the extraction port 60 of the air recirculation duct 24. The valve 86 may be configured to vary a flow of gases through the extraction port 60.

The valve 86 may be a butterfly valve configured to change between a closed position (represented as 86') and an open position (represented as 86) to control the flow of gases directed out of the gas path 18 into the air recirculation duct 24. In the closed position, the valve 86' extends across the extraction port 60 to block an opening 76 in the opening end 74 of the extraction port 60 and prevent the flow of gases through the extraction port 60. In the open position, the valve 86 has rotated about the pivot point 85 so as to be spaced apart from the opening 76 and allow the flow of gases through the extraction port 60.

In the open position, the valve 86 may be flush with the gas path 18 as suggested in FIG. 4A. In other embodiments, the valve 86 may extend into the gas path 18 when in the open position.

The valve 86 may include a scoop 88 as suggested in FIG. 4A. The scoop 88 is configured to change between a retracted position (represented as 88') and an extended position (represented as 88) to control the flow of gases directed out of the gas path 18 into the air recirculation duct 24.

In the retracted position, the scoop 88' extends into the extraction port 60 and is flush with the gas path 18 so as not to extend into the gas path 18. In the extended position, the flap 88 has moved to extend into the gas path 18 to direct a portion of the gases flowing through the gas path 18 toward the opening 76 of the extraction port 60.

In some embodiments, the scoop 88 translated radially between the retracted position and the extended position. In the illustrative embodiment, the scoop 88 pivots about the pivot point 89 between the retracted position and the extended position.

In other embodiments, the valve 86 may be a flap configured to change between a closed position and an open position to control the flow of gases directed out of the gas path 18 into the air recirculation duct 24. In the closed position, the flap blocks the opening 76 of the extraction port 60 to prevent the flow of gases through the extraction port 60. The flap extends over the opening 76 to block the flow of gases through the extraction port 60. In the open position, the flap is spaced apart from the opening 76 of the opening end 74 of the extraction port 60 and extends into the gas path 18 to direct a portion of the gases flowing through the gas path 18 toward the opening 76 of the extraction port 60.

The injection portion 64 has a first section 78 that extends from the conduit 62 and an opening end 80 that extends from the first section 78 and opens into the gas path 18 as shown in FIG. 4. The opening end 80 is located axially forward of the hook 40 such that the opening end 80 extends through a portion of the acoustic liner 26. In the illustrative embodiment, the opening end 80 is located axially forward of the forward flange 46 of the hook 40.

In the illustrative embodiment, the opening end 80 extends radially and axially so that the opening end 80 is at an angle 80A relative to a radial axis 93. The angle 80A of the opening end 80 may be adjusted to change the axial location of an opening 82 formed by the opening end 80. In the illustrative embodiment, the opening 82 is spaced apart axially from the forward flange 46 of the hook 40.

In the illustrative embodiment, the injection port 64 has a cross-sectional area 64D that is smaller than the area 62D of the conduit 62 as shown in FIG. 4. The area 64D of the injection port 64 may be varied to control the flow of gases injected in the gas path 18. In the illustrative embodiment, the conduit 62 extends axially at a slight angle to the axis 11 of the gas turbine engine 110 as shown in FIG. 4.

The extraction port 60 and the injection port 64 may have an oblong cross-section as suggested in FIG. 10. Each of the extraction port 60 and the injection port 64 may extend in circumferential direction to define the oblong cross-section. The extraction port 60 may have a circumferential width 60W and the injection port 64 may have a circumferential width 64W as shown in FIG. 10. In some embodiments, the widths 60W, 64W of the extraction and injection ports 60, 64 may have equal widths. In other embodiments, one of the extraction port 60 or the injection port 64 may have a greater width than the other.

A method of assembling and using the fan case assembly 10 may include several steps. The method includes coupling the fan track liner 22 to the annular case 20. The fan track liner 22 is coupled to the case 20 by extending the forward end 30 into the channel 52 and engaging the aft flange 48 of the hook 40 with the forward end 30 of the fan track liner 22. Additionally the forward and aft acoustic panel 26, 28 are coupled to the case 20 axially forward and aft of the fan track liner 22.

The method further includes extending the extraction port 60 radially inward through the annular case 20 and extending the injection port 64 radially inward through the annular case 20 so that the conduit 62 is located radially outward of the annular case 20. The extraction port 60 is extended through the annular case 20 axially aft of the aft end 32 of the fan track liner 22. The injection port 64 is extended radially inward through the annular case 20 axially forward of the forward end 30 of the fan track liner 22.

The injection port 64 is extended through the case 20 in the first zone 54. The extraction port 60 is extended through the case 20 in one of the second or third zones 56, 58. In the illustrative embodiment, the extraction port 60 is extended through the case 20 in the second zone 56.

After the fan case assembly 10 is assembled, the method includes recirculating gases into the gas path 18 in the fan 112 of the gas turbine engine 110. During use of the gas turbine engine 110, a portion of the gases flowing through the gas path 18 is directed out of the gas path 18 by the extraction port 60 axially aft of the aft end 32 of the fan track liner 22. The gases flow through the opening 82 of the extraction port 60 radially outward through the case 20 axially aft of the flange 42 and are directed axially forward by the conduit 62. The gases are then directed radially inward back through the case 20 and into the gas path 18 axially forward of the forward end 30 of the fan track liner 22.

In some embodiments, the method includes controlling the amount of gases directed out of the gas path 18 by the extraction port 60. The method may include changing the valve 86 coupled to the extraction port 60 between the open and closed positions to control the gases flowing through the air recirculation duct 24. The method may include changing the valve 86 to the open position to increase the flow of gases into the extraction port 60 and changing the valve 86 to the closed position to block the flow of gases into the extraction port 60.

Figure 5:
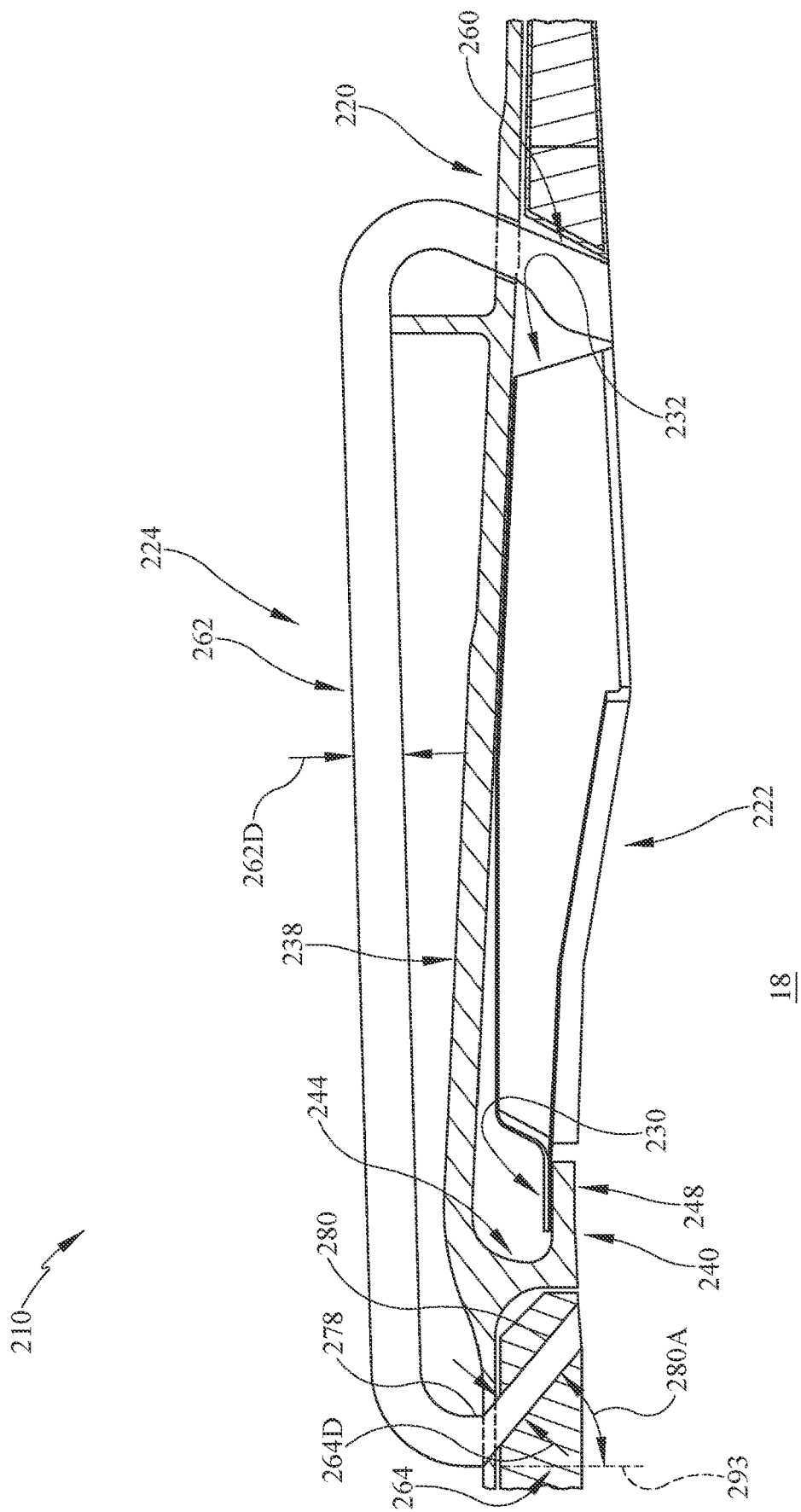
FIG. 5 is another embodiment of a fan case assembly for the gas turbine engine of FIG. 1 showing the fan case assembly includes an annular case, a fan track liner coupled to the case, and an air recirculation duct that includes an extraction port, an injection port, and a conduit that extends between and interconnects the extraction port and the injection port at a location radially outward of the outer wall, and further showing the angle of the injection port is sharp to cause the injection port to open closer to a hook of the annular case.

Another embodiment of the fan case assembly 210 in accordance with the present disclosure is shown in FIG. 5. The fan case assembly 210 is substantially similar to the fan case assembly 10 shown in FIGS. 1-4A and described herein. Accordingly, similar reference numbers in the 200 series indicate features that are common between the fan case assembly 210 and the fan case assembly 10. The description of the fan case assembly 10 is incorporated by reference to apply to the fan case assembly 210, except in instances when it conflicts with the specific description and the drawings of the fan case assembly 210.

The fan case assembly 210 includes an annular case 220, a fan track liner 222, and an air recirculation duct 224 as shown in FIG. 5. The annular case 220 is configured to support the fan track liner 222 at a radial position relative to the axis 11 of the gas turbine engine 110. The air recirculation duct 224 is configured to direct a portion of gases flowing through the gas path 18 of the gas turbine engine 110 from an aft end 232 of the fan track liner 222 into the gas path 18 axially forward of a forward end 230 of the fan track liner 222.

The air recirculation duct 224 includes an extraction port 260, a conduit 262, and an injection port 264 as shown in FIG. 5. Both the extraction port 260 and the injection port 264 are in fluid communication with the gas path 18 of the gas turbine engine 110, while the conduit 262 is in fluid communication with the extraction and injection ports 260, 264. The extraction port 260 extends radially through an outer wall 238 of the case 220 at a location axially aft of the aft end 232 of the fan track liner 222. The conduit 262 extends axially forward from the extraction port 260 toward the forward end 230 of the fan track liner 222 to the injection port 264. The injection port 264 extends radially inward from the conduit 262 through the outer wall 238 of the case 220 at a location axially forward of the forward end 230 of the fan track liner 222.

In the illustrative embodiment, an opening end 280 of the injection port 264 extends through the outer wall 238 of the case 220 axially forward of a hook 240 included in the case 220. The opening end 280 is located closer to the hook 240 than in the embodiment of FIG. 4 because the hook 240 only has a radially-extending portion 244 and an aft flange 248 as shown in FIG. 5.

The injection portion 264 extends radially inward through the outer wall 238 and extends axially aft toward the hook 240 as shown in FIG. 5. The opening end 280 of the injection port 264 is spaced axially forward of the radially-extending portion 244 of the hook 240.

In the illustrative embodiment, the opening end 280 extends radially and axially from a first section 278 of the injection port 264 so that the opening end 280 is at an angle 280A relative to a radial axis 293. The angle 280A of the opening end 280 is greater than the angle 80A of the injection port 64 of the embodiment in FIGS. 1-4. In some embodiments, the angle 280A of the opening end 280 is between about 30 and 90 degrees. In some embodiments, the angle 280A of the opening end 280 is between about 30 and 80 degrees. In some embodiments, the angle 280A of the opening end 280 is between about 45 and 90 degrees. In some embodiments, the angle 280A of the opening end 280 is between about 45 and 80 degrees. In some embodiments, the angle 280A of the opening end 280 is between about 45 and 70 degrees.

In the illustrative embodiment, the injection port 264 has a cross-sectional area 264D that is smaller than the area 262D of the conduit 262 as shown in FIG. 5. The area 264D that is also smaller than the area 64D of the injection port 64 of the embodiment in FIGS. 1-4.

Figure 6:
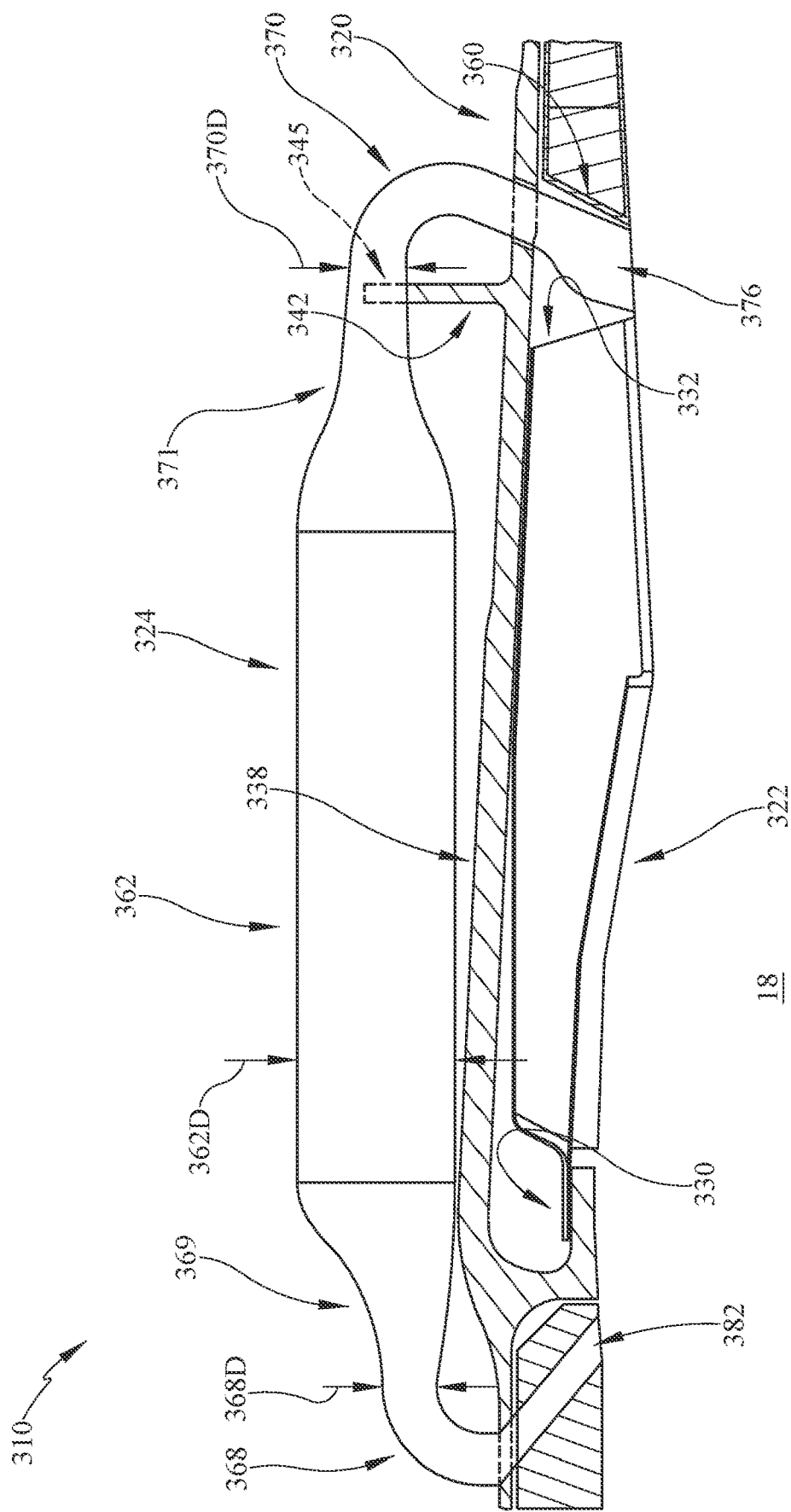
FIG. 6 is another embodiment of a fan case assembly for the gas turbine engine of FIG. 1 showing the fan case assembly includes an annular case, a fan track liner coupled to the case, and an air recirculation duct that includes an extraction port, an injection port, and a conduit that extends between and interconnects the extraction port and the injection port at a location radially outward of the outer wall, and further showing the conduit has a varying cross-section moving axially aft from the injection port to the extraction port to allow a preferred area change and/or to manage the packaging of the duct in the fan case assembly.

Another embodiment of the fan case assembly 310 in accordance with the present disclosure is shown in FIG. 6. The fan case assembly 310 is substantially similar to the fan case assembly 10 shown in FIGS. 1-4A and described herein. Accordingly, similar reference numbers in the 300 series indicate features that are common between the fan case assembly 310 and the fan case assembly 10. The description of the fan case assembly 10 is incorporated by reference to apply to the fan case assembly 310, except in instances when it conflicts with the specific description and the drawings of the fan case assembly 310.

The fan case assembly 310 includes an annular case 320, a fan track liner 322, and an air recirculation duct 324 as shown in FIG. 6. The annular case 320 is configured to support the fan track liner 322 at a radial position relative to the axis 11 of the gas turbine engine 110. The air recirculation duct 324 is configured to direct a portion of gases flowing through the gas path 18 of the gas turbine engine 110 from an aft end 332 of the fan track liner 322 into the gas path 18 axially forward of a forward end 330 of the fan track liner 322.

The air recirculation duct 324 includes an extraction port 360, a conduit 362, and an injection port 364 as shown in FIG. 6. Both the extraction port 360 and the injection port 364 are in fluid communication with the gas path 18 of the gas turbine engine 110, while the conduit 362 is in fluid communication with the extraction and injection ports 360, 364. The extraction port 360 extends radially through an outer wall 338 of the case 320 at a location axially aft of the aft end 332 of the fan track liner 322. The conduit 362 extends axially forward from the extraction port 360 toward the forward end 330 of the fan track liner 322 to the injection port 364. The injection port 364 extends radially inward from the conduit 362 through the outer wall 338 of the case 320 at a location axially forward of the forward end 330 of the fan track liner 322.

The conduit 362 extends between a forward end 368 and an aft end 370 as shown in FIG. 6. The extraction port 360 extends radially inward and axially forward from the aft end 370 of the conduit 362, while the injection port 364 extends radially inward and axially aft from the forward end 368 of the conduit 362. The conduit 362 has a varying cross-section moving from the forward end 368 to the aft end 370 as shown in FIG. 6.

In the illustrative embodiment, the conduit 362 has a first cross-sectional area 368A, 370D at the forward and aft ends 368, 370 and a second cross-sectional area 362D at a location axially between the forward and aft ends 368, 370 as shown in FIG. 6. The area 362D is less than the area 368D, 370D at the forward and aft ends 368, 370. In the illustrative embodiment, the conduit 362 extends axially parallel with the axis 11 of the gas turbine engine 110.

The conduit 362 has transition sections 369, 371 where the conduit 362 transitions form the first area 368D, 370D to the second area 362D as shown in FIG. 6. The transitions sections 369, 371 have a varying cross-sectional area.

In the illustrative embodiment, the cross-section of the conduit 362 may vary such that the cross-section has a variety of shapes moving from the forward end 368 to the aft end 370 of the conduit 362. The cross-section shape may depend on the packing of the duct 24 in the fan case assembly 10.

In some embodiments, the cross-section of the conduit 362 may be oblong and extends circumferentially at least partway about the axis 11. The openings 376, 382 of the extraction and injection ports 360, 364 by also have an oblong cross-section and extend at least circumferentially partway about the axis 11. The cross-section of the conduit 362 may varying moving from the forward end 368 to the aft end 370 depending on the packing of the duct 24 in the fan case assembly 10.

In some embodiments, the flange 342 of the case 320 includes a notch 345 as suggested in FIG. 6. The flange 342 engages conduit 362 adjacent to the aft end 370 of the conduit 362 such that the conduit 362 extends into the notch 345.

Figure 7:
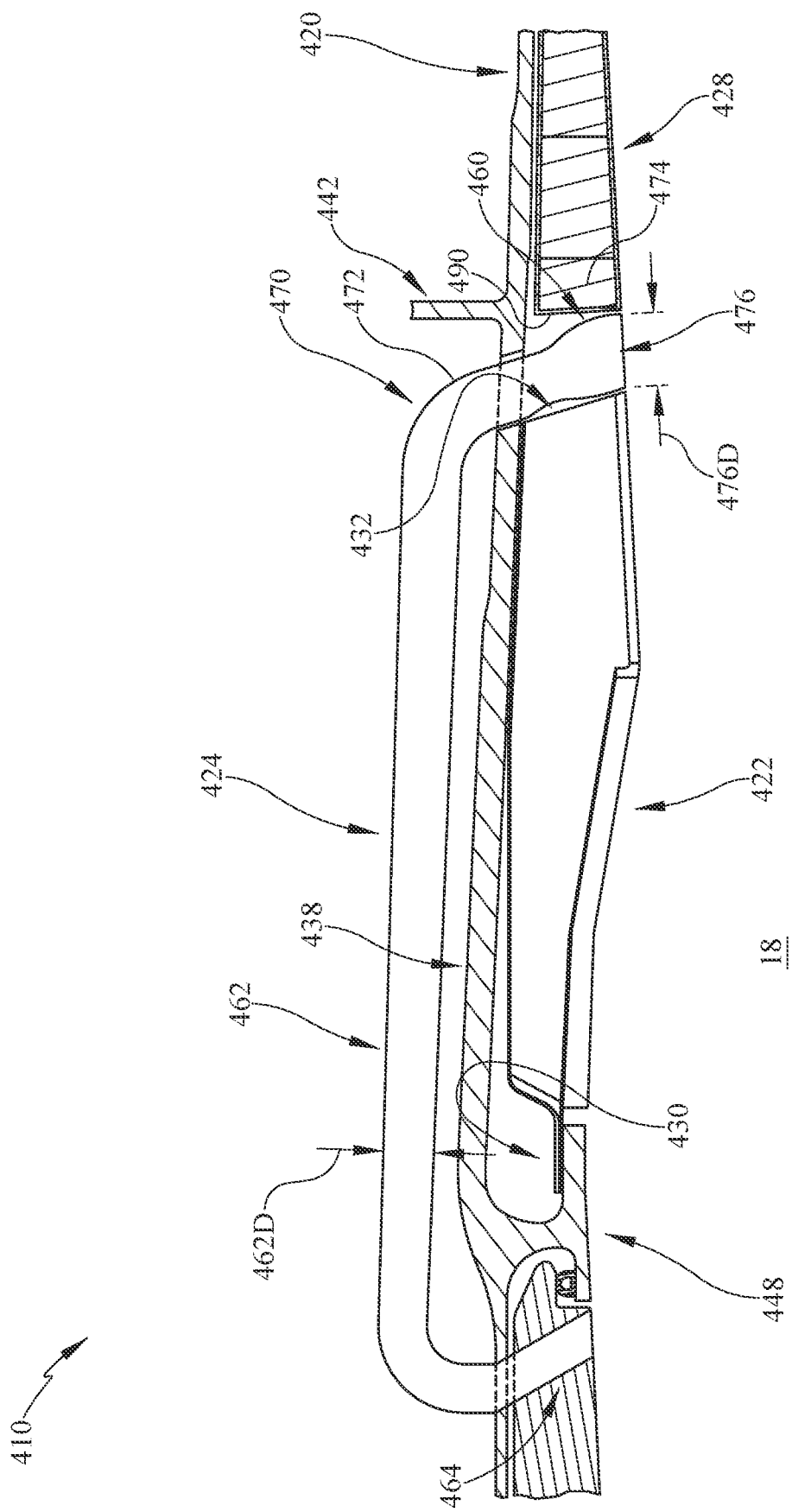
FIG. 7 is another embodiment of a fan case assembly for the gas turbine engine of FIG. 1 showing the fan case assembly includes an annular case, a fan track liner coupled to the case, and an air recirculation duct that includes an extraction port, an injection port, and a conduit that extends between and interconnects the extraction port and the injection port at a location radially outward of the outer wall, and further showing the extraction port extends through the outer wall at a location axially forward of the flange of the annular case.

Another embodiment of the fan case assembly 410 in accordance with the present disclosure is shown in FIG. 7. The fan case assembly 410 is substantially similar to the fan case assembly 10 shown in FIGS. 1-4A and described herein. Accordingly, similar reference numbers in the 400 series indicate features that are common between the fan case assembly 410 and the fan case assembly 10. The description of the fan case assembly 10 is incorporated by reference to apply to the fan case assembly 410, except in instances when it conflicts with the specific description and the drawings of the fan case assembly 410.

The fan case assembly 410 includes an annular case 420, a fan track liner 422, and an air recirculation duct 424 as shown in FIG. 7. The annular case 420 is configured to support the fan track liner 422 at a radial position relative to the axis 11 of the gas turbine engine 110. The air recirculation duct 424 is configured to direct a portion of gases flowing through the gas path 18 of the gas turbine engine 110 from an aft end 432 of the fan track liner 422 into the gas path 18 axially forward of a forward end 430 of the fan track liner 422.

The air recirculation duct 424 includes an extraction port 460, a conduit 462, and an injection port 464 as shown in FIG. 7. Both the extraction port 460 and the injection port 464 are in fluid communication with the gas path 18 of the gas turbine engine 110, while the conduit 462 is in fluid communication with the extraction and injection ports 460, 464. The extraction port 460 extends radially through an outer wall 438 of the case 420 at a location axially aft of the aft end 432 of the fan track liner 422. The conduit 462 extends axially forward from the extraction port 460 toward the forward end 430 of the fan track liner 422 to the injection port 464. The injection port 464 extends radially inward from the conduit 462 through the outer wall 438 of the case 420 at a location axially forward of the forward end 430 of the fan track liner 422. In the illustrative embodiment, the conduit 462 extends axially parallel with the outer wall 438 of the annular case 420.

The annular case 420 includes the outer wall 438, a hook 440, and a flange 442 as shown in FIG. 7. The outer wall 438 extends circumferentially around the central axis 11 of the gas turbine engine 110. The hook 440 extends radially inward from the outer wall 438 to support the forward end 430 of the fan track liner 422. The flange 442 extends radially outward from the outer wall 438 axially aft of the hook 440.

In the illustrative embodiment, the extraction port 460 extends through the outer wall 438 axially forward of the flange 442 instead of axially aft of the flange 442 like in the embodiments of FIGS. 1-6. The extraction port 460 extends radially inward and axially aft from an aft end 470 of the conduit 462 such that the aft end 470 forms a bend or curve. However, because the extraction port 460 extends axially aft, the bend of the aft end 470 of the conduit 462 bends at a larger angel than in the embodiments of FIGS. 1-6.

The extraction port 460 has a first section 472 that extends from the conduit 462 and an opening end 474 that extends from the first section 72 and opens into the gas path 18 as shown in FIG. 7. The opening end 474 is located between the aft end 432 of the liner 422 and a forward end of the acoustic panel 428.

The opening end 474 is located axially forward of the flange 442 and a forward end 490 of the acoustic liner 428 as shown in FIG. 7. The opening end 474 is spaced apart from the forward end 490 of the acoustic liner 428 such that the extraction port 460 does not extend through a portion of the acoustic liner 428.

In the illustrative embodiment, the extraction port 460 has a different shape than embodiments of FIGS. 1-6. The extraction port 460 has a variable cross-sectional area. The opening end 474 of has an opening 476 with a cross-sectional area 476A that is greater than the area 462D of the conduit 462.

A method of assembling and using the fan case assembly 410 may include several steps. The method includes coupling the fan track liner 422 to the annular case 420, extending the extraction port 460 radially inward through the annular case 420, and extending the injection port 464 radially inward through the annular case 420 so that the conduit is located radially outward of the annular case. The extraction port 460 is extended through the annular case 420 axially aft of the aft end 432 of the fan track liner 422 axially forward of the flange 442. The injection port 464 is extended radially inward through the annular case 420 axially forward of the forward end 430 of the fan track liner 422.

Figure 8:
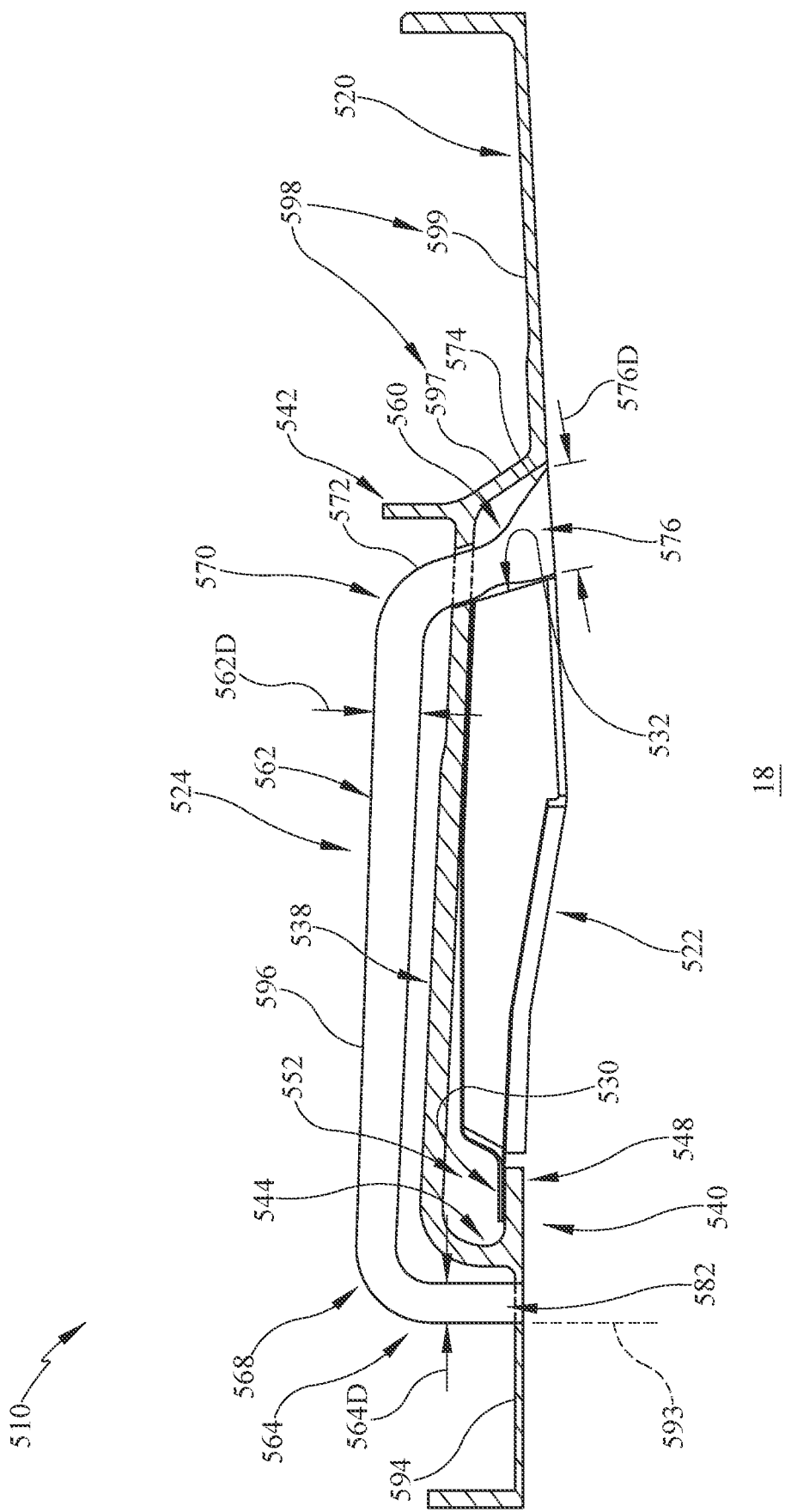
FIG. 8 is another embodiment of a fan case assembly for the gas turbine engine of FIG. 1 showing the fan case assembly includes an annular case, a fan track liner coupled to the case, and an air recirculation duct that includes an extraction port, an injection port, and a conduit that extends between and interconnects the extraction port and the injection port at a location radially outward of the outer wall, and further showing the fan case defines a portion of the gas path axially forward and aft of the fan track liner and the extraction port has an opening end that flares out so that the opening has a larger area than the rest of the air recirculation duct.

Another embodiment of the fan case assembly 510 in accordance with the present disclosure is shown in FIG. 8. The fan case assembly 510 is substantially similar to the fan case assembly 10 shown in FIGS. 1-4A and described herein. Accordingly, similar reference numbers in the 500 series indicate features that are common between the fan case assembly 510 and the fan case assembly 10. The description of the fan case assembly 10 is incorporated by reference to apply to the fan case assembly 510, except in instances when it conflicts with the specific description and the drawings of the fan case assembly 510.

The fan case assembly 510 includes an annular case 520, a fan track liner 522, and an air recirculation duct 524 as shown in FIG. 8. The annular case 520 is configured to support the fan track liner 522 at a radial position relative to the axis 11 of the gas turbine engine 110. The air recirculation duct 524 is configured to direct a portion of gases flowing through the gas path 18 of the gas turbine engine 110 from an aft end 532 of the fan track liner 522 into the gas path 18 axially forward of a forward end 530 of the fan track liner 522.

The air recirculation duct 524 includes an extraction port 560, a conduit 562, and an injection port 564 as shown in FIG. 8. Both the extraction port 560 and the injection port 564 are in fluid communication with the gas path 18 of the gas turbine engine 110, while the conduit 562 is in fluid communication with the extraction and injection ports 560, 564. The extraction port 560 extends radially through an outer wall 538 of the case 520 at a location axially aft of the aft end 532 of the fan track liner 522. The conduit 562 extends axially forward from the extraction port 560 toward the forward end 530 of the fan track liner 522 to the injection port 564. The injection port 564 extends radially inward from the conduit 562 through the outer wall 538 of the case 520 at a location axially forward of the forward end 530 of the fan track liner 522.

The annular case 520 includes the outer wall 538, a hook 540, and a flange 542 as shown in FIG. 8. The outer wall 538 extends circumferentially around the central axis 11 of the gas turbine engine 110. The hook 540 is configured to support the forward end 530 of the fan track liner 522. The flange 542 extends radially outward from the outer wall 538 axially aft of the hook 540. In the illustrative embodiment, portions of the outer wall 538 define a portion of the gas path 18 of the gas turbine engine 110 as shown in FIG. 8.

The fan case assembly 510 does not include acoustic panels like in the embodiments of FIGS. 1-7. Rather, the outer wall 538 forms a portion of the gas path 18 as shown in FIG. 8. The outer wall 538 includes a forward section 594, an intermediate section 596, and an aft section 598 as shown in FIG. 8. The hook 540 is formed between the forward section 594 and the intermediate section 596 of the outer wall 538. The aft section 598 that extends axially aft from the intermediate section 596.

The hook 540 includes a radially-extending portion 544 and an aft flange 548 as shown in FIG. 8. The radially-extending portion 544 extends radially inward form the intermediate section 596 of the outer wall 38 to the forward section 594 of the outer wall 538. The aft flange 548 extends axially aft away from the radially-extending portion 544 at a location radially spaced apart from the intermediate portion 596 of the outer wall 538 to form an axially opening channel 552. In the illustrative embodiment, the aft flange 548 is flush with the forward section 594 of the outer wall 538 so as to form a portion of the gas path 18 as shown in FIG. 8.

In the illustrative embodiment, the flange 548 of the case 520 extends from the outer wall 538 at the intersection of the intermediate section 596 and the aft section 598 of the outer wall 538. The aft section 598 has a radially-extending portion 597 and an axially-extending portion 599 as shown in FIG. 8. The radially-extending portion 597 extends radially inward from the intermediate section 596 toward the gas path 18 and the axially-extending portion 599 extends axially aft form the radially-extending portion 597. The axially-extending portion 599 forms a portion of the gas path 18.

The conduit 562 extends between a forward end 568 and an aft end 570 as shown in FIG. 8. The extraction port 560 extends radially inward and axially aft from the aft end 570 of the conduit 562 such that the aft end 570 forms a bend or curve. The injection port 564 extends radially inward and from the forward end 568 of the conduit 562 such that the forward end 568 forms a bend or curve.

The extraction port 560 has a first section 572 that extends from the conduit 562 and an opening end 574 that extends from the first section 572 and opens into the gas path 18 as shown in FIG. 8. The opening end 574 is located between the aft end 532 of the liner 522 and the radially-extending portion 597. The first section 572 extends through the outer wall 538 of the case 520 axially forward of the flange 542 in the illustrative embodiment.

In the illustrative embodiment, the first section 572 of the extraction port 560 has a first cross-sectional area 572D, while the opening end 574 flares out so that an opening 576 of the opening end 574 has a larger area 576A than the first area 572D. The area 576A of the opening 576 is greater than the area 562D as shown in FIG. 8.

The injection port 564 extends radially inward from the forward end 568 of the conduit 562 as shown in FIG. 8. The injection port 564 does not extend axially such that the injection port 564 is parallel to a radial axis 593. The injection port 564 extends through the forward section 594 of the outer wall 538 axially forward of the radially-extending portion 544. The opening 582 of the injection port 564 is flush with the forward section 594 of the outer wall 538. In the illustrative embodiment, the injection port 564 has a cross-sectional area 564D that is equal to the area 562D of the conduit 562 as shown in FIG. 8.

Figure 9:
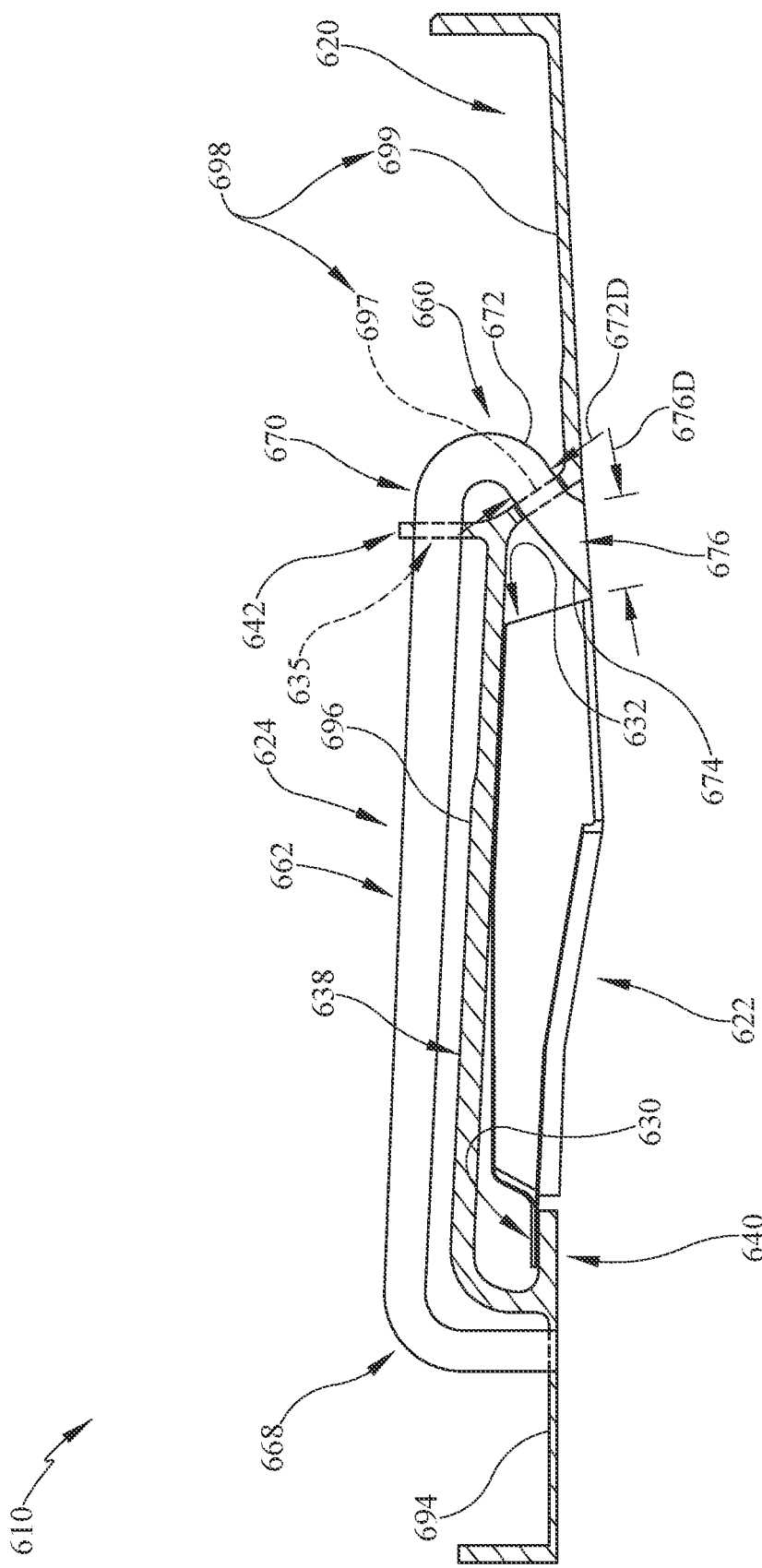
FIG. 9 is another embodiment of a fan case assembly for the gas turbine engine of FIG. 1 showing the fan case assembly includes an annular case, a fan track liner coupled to the case, and an air recirculation duct that includes an extraction port, an injection port, and a conduit that extends between and interconnects the extraction port and the injection port at a location radially outward of the outer wall, and further showing the fan case defines a portion of the gas path axially forward and aft of the fan track liner and the conduit extends through a flange of the annular case.

Another embodiment of the fan case assembly 610 in accordance with the present disclosure is shown in FIG. 9. The fan case assembly 610 is substantially similar to the fan case assembly 10 shown in FIGS. 1-4A and described herein. Accordingly, similar reference numbers in the 600 series indicate features that are common between the fan case assembly 610 and the fan case assembly 10. The description of the fan case assembly 10 is incorporated by reference to apply to the fan case assembly 610, except in instances when it conflicts with the specific description and the drawings of the fan case assembly 610.

The fan case assembly 610 includes an annular case 620, a fan track liner 622, and an air recirculation conduit 624 as shown in FIG. 9. The annular case 620 is configured to support the fan track liner 622 at a radial position relative to the axis 11 of the gas turbine engine 110. The air recirculation conduit 624 is configured to direct a portion of gases flowing through the gas path 18 of the gas turbine engine 110 from an aft end 632 of the fan track liner 622 into the gas path 18 axially forward of a forward end 630 of the fan track liner 622.

The air recirculation conduit 624 includes an extraction port 660, a conduit 662, and an injection port 664 as shown in FIG. 9. Both the extraction port 660 and the injection port 664 are in fluid communication with the gas path 18 of the gas turbine engine 110, while the conduit 662 is in fluid communication with the extraction and injection ports 660, 664. The extraction port 660 extends radially through an outer wall 638 of the case 620 at a location axially aft of the aft end 632 of the fan track liner 622. The conduit 662 extends axially forward from the extraction port 660 toward the forward end 630 of the fan track liner 622 to the injection port 664. The injection port 664 extends radially inward from the conduit 662 through the outer wall 638 of the case 620 at a location axially forward of the forward end 630 of the fan track liner 622.

The annular case 620 includes the outer wall 638, a hook 640, and a flange 642 as shown in FIG. 9. The outer wall 638 extends circumferentially around the central axis 11 of the gas turbine engine 110. The hook 640 is configured to support the forward end 630 of the fan track liner 622. The flange 642 extends radially outward from the outer wall 638 axially aft of the hook 640. In the illustrative embodiment, portions of the outer wall 638 define a portion of the gas path 18 of the gas turbine engine 110 as shown in FIG. 9.

The outer wall 638 includes a forward section 694, an intermediate section 696, and an aft section 698 as shown in FIG. 9. The hook 640 is formed between the forward section 694 and the intermediate section 696 of the outer wall 638. The aft section 698 that extends axially aft from the intermediate section 696. The air recirculation conduit 624 extends axially through the flange 642 and through the aft section 698 of the outer wall 638 as shown in FIG. 8.

In the illustrative embodiment, the flange 642 of the case 620 extends from the outer wall 638 at the intersection of the intermediate section 696 and the aft section 698 of the outer wall 638 as shown in FIG. 9. The aft section 698 has a radially-extending portion 697 and an axially-extending portion 699 as shown in FIG. 9. The radially-extending portion 697 extends radially inward from the intermediate section 696 toward the gas path 18 and the axially-extending portion 699 extends axially aft form the radially-extending portion 697. The axially-extending portion 699 forms a portion of the gas path 18.

The conduit 662 extends between a forward end 668 and an aft end 670 as shown in FIG. 9. The extraction port 660 extends radially inward and axially forward from the aft end 670 of the conduit 662 such that the aft end 670 forms a bend or curve. The injection port 664 extends radially inward and from the forward end 668 of the conduit 662 such that the forward end 668 forms a bend or curve.

In the illustrative embodiment, the conduit 662 extends axially through the flange 642 such that the aft end 670 is located axially aft of the flange 642 of the outer wall 538. The flange 642 is shaped to include a notch 635 and the conduit 662 extends through the notch 635 in the flange 642 as shown in FIG. 9. The conduit 662 is parallel with the intermediate section 696 in the illustrative embodiment.

The conduit 662 bends axially aft of the flange 642 so that the extraction port 660 extends radially inward and axially forward through the aft section 698 of the outer wall 638. The extraction port 660 extends radially inward and axially forward through the radially-extending portion 697 of the aft section 598 in the illustrative embodiment.

The extraction port 660 has a first section 672 that extends from the conduit 662 and an opening end 674 that extends from the first section 672 and opens into the gas path 18 as shown in FIG. 9. The opening end 674 is located between the aft end 632 of the liner 622 and the radially-extending portion 697. The first section 672 extends through the outer wall 638 of the case 620 axially forward of the flange 642 in the illustrative embodiment.

In the illustrative embodiment, the first section 672 of the extraction port 660 has a first cross-sectional area 672D, while the opening end 674 flares out so that an opening 676 of the opening end 674 has a larger area 676A than the first area 672D.

A method of assembling and using the fan case assembly 610 may include several steps. The method includes coupling the fan track liner 622 to the annular case 620, extending the extraction port 660 radially inward through the annular case 620, and extending the injection port 664 radially inward through the annular case 620 so that the conduit is located radially outward of the annular case. The extraction port 660 is extended through the flange 642 and the radially-extending portion 697 so that the extraction port 660 is aft of the aft end 632 of the fan track liner 622. The injection port 664 is extended radially inward through the annular case 620 axially forward of the forward end 630 of the fan track liner 622.

Figure 11:
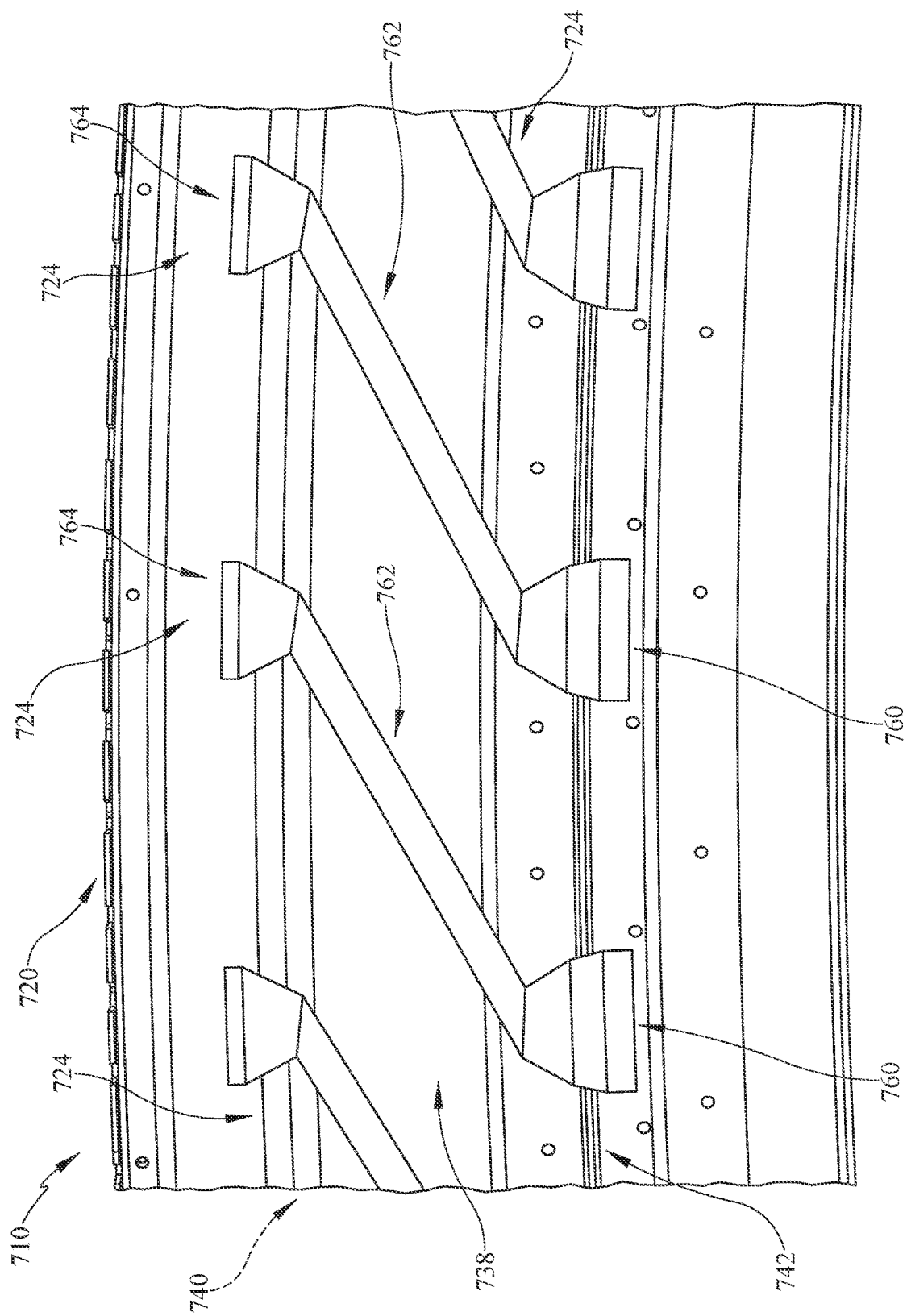
FIG. 11 is an elevation view of another embodiment of a fan case assembly for the gas turbine engine of FIG. 1 looking radially inward from radially outward of the fan case assembly showing an air recirculation duct included in the fan case assembly extends axially and circumferentially such that an extraction port included in the air recirculation duct is circumferentially offset from an injection port included in the air recirculation duct.

Another embodiment of the fan case assembly 710 in accordance with the present disclosure is shown in FIG. 11. The fan case assembly 710 is substantially similar to the fan case assembly 10 shown in FIGS. 1-4A and described herein. Accordingly, similar reference numbers in the 700 series indicate features that are common between the fan case assembly 710 and the fan case assembly 10. The description of the fan case assembly 10 is incorporated by reference to apply to the fan case assembly 710, except in instances when it conflicts with the specific description and the drawings of the fan case assembly 710.

The fan case assembly 710 includes an annular case 720 and an air recirculation duct 724 as shown in FIG. 11. The annular case 720 is configured to support the fan track liner at a radial position relative to the axis 11 of the gas turbine engine 110. The air recirculation duct 724 is configured to direct a portion of gases flowing through the gas path 18 of the gas turbine engine 110 from an aft end of the fan track liner into the gas path 18 axially forward of a forward end of the fan track liner.

The air recirculation duct 724 includes an extraction port 760, a conduit 762, and an injection port 764 as shown in FIG. 11. Both the extraction port 760 and the injection port 764 are in fluid communication with the gas path 18 of the gas turbine engine 110, while the conduit 762 is in fluid communication with the extraction and injection ports 760, 764. The extraction port 760 extends radially through an outer wall 738 of the case 720 at a location axially aft of the aft end of the fan track liner. The conduit 762 extends axially forward from the extraction port 760 toward the forward end of the fan track liner to the injection port 764. The injection port 764 extends radially inward from the conduit 762 through the outer wall 738 of the case 720 at a location axially forward of the forward end of the fan track liner.

In the illustrative embodiment, the injection port 764 is circumferentially offset from the extraction port 760 as shown in FIG. 11. As such, the conduit 762 extends axially and circumferentially from the extraction port 760 to the injection port 764.

In the illustrative embodiment, the injection port 764 extends through the outer wall 738 of the case 720 axially forward of the hook 740 and the extraction port 760 extends through the outer wall 738 axially aft of the flange 742 as shown in FIGS. 2 and 4. The conduit 762 is located radially outward of the flange 742 of the annular case 720.

Figure 12:
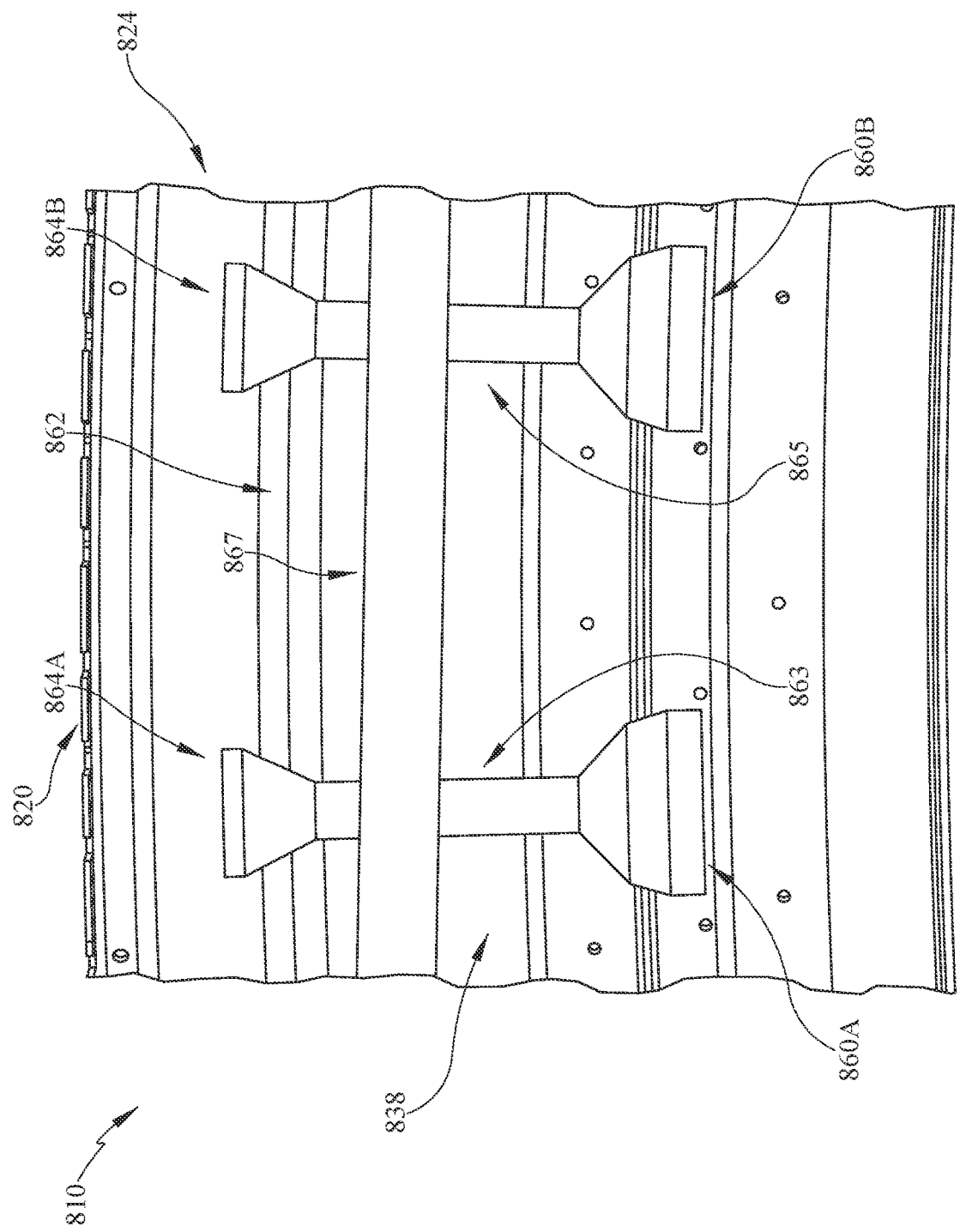
FIG. 12 is an elevation view of another embodiment of a fan case assembly for the gas turbine engine of FIG. 1 looking radially inward from radially outward of the fan case assembly showing an air recirculation duct included in the fan case assembly includes extraction ports spaced apart circumferentially from each other, injection ports spaced apart circumferentially from each other, and a manifold that extends circumferentially part way about the axis between the extraction ports and the injection ports so as to put the extraction ports and injection ports in fluid communication with each other.

Another embodiment of the fan case assembly 810 in accordance with the present disclosure is shown in FIG. 12. The fan case assembly 810 is substantially similar to the fan case assembly 10 shown in FIGS. 1-4A and described herein. Accordingly, similar reference numbers in the 800 series indicate features that are common between the fan case assembly 810 and the fan case assembly 10. The description of the fan case assembly 10 is incorporated by reference to apply to the fan case assembly 810, except in instances when it conflicts with the specific description and the drawings of the fan case assembly 810.

The fan case assembly 810 includes an annular case 820 and an air recirculation duct 824 as shown in FIG. 12. The annular case 820 is configured to support the fan track liner at a radial position relative to the axis 11 of the gas turbine engine 110. The air recirculation duct 824 includes extraction ports 860A, 860B, a manifold 862, and injection ports 864A, 864B as shown in FIG. 12.

The extraction ports 860A, 860B and the injection ports 864A, 864B are in fluid communication with the gas path 18 of the gas turbine engine 110, while the manifold 862 is in fluid communication with the extraction and injection ports 860A, 860B, 864A, 864B. The manifold 862 extends between the extraction ports 860A, 860B and injection ports 864A, 864B to put them all in fluid communication with each other. In this way, the portion of gases directed out of the gas path by one of the extraction ports 860A, 860B may flow to either one of the injection ports 864A, 864B.

The extraction ports 860A, 860B extend radially through an outer wall 838 of the case 820 at a location axially aft of the aft end of the fan track liner. The injection ports 864A, 864B extend radially inward through the outer wall 838 of the case 820 at a location axially forward of the forward end of the fan track liner. The second extraction port 860B is spaced apart circumferentially from the first extraction port 860A, and the second injection port 864B is spaced apart circumferentially from the first injection port 864A as shown in FIG. 12.

The first extraction port 860A is circumferentially aligned with the first injection port 864A, while the second extraction port 860B is circumferentially aligned with the second injection port 864B as shown in FIG. 12. The manifold extend circumferentially about the axis 11 between the ports 860A, 860B, 864A, 864B.

The manifold 862 includes a first conduit 863, a second conduit 865, and an interconnecting conduit 867 as shown in FIG. 12. The first conduit 863 extends axially forward from the first extraction port 860A toward the forward end of the fan track liner to the first injection port 864A. The second conduit 865 extends axially forward from the second extraction port 860B toward the forward end of the fan track liner to the second injection port 864B. The interconnecting conduit 867 extends circumferentially between the first and second conduits 863, 865.

In the illustrative embodiment, the interconnecting conduit 867 extends at least circumferentially partway about the axis 11 between the first and second conduits 863, 865 so that the gases that enter in the air recirculation duct 824 may flow to either one of the first or second injection ports 864A, 864B. For example, of the gases that flow into the first extraction port 860A, a portion of the gases may flow through the first conduit 863 to the first injection port 864A, while another portion of the gases may flow through the first conduit 863, the interconnecting conduit 867, and the second conduit 865 to the second injection port 864B. Similarly, of the gases that flow into the second extraction port 860B, a portion of the gases may flow through the second conduit 865 to the second injection port 864B, while another portion of the gases may flow through the second conduit 865, the interconnecting conduit 867, and the first conduit 863 to the first injection port 864A.

Another embodiment of the fan case assembly 910 in accordance with the present disclosure is shown in FIG. 13. The fan case assembly 910 is substantially similar to the fan case assembly 10 shown in FIGS. 1-4A and described herein. Accordingly, similar reference numbers in the 900 series indicate features that are common between the fan case assembly 910 and the fan case assembly 10. The description of the fan case assembly 10 is incorporated by reference to apply to the fan case assembly 910, except in instances when it conflicts with the specific description and the drawings of the fan case assembly 910.

The fan case assembly 910 includes an annular case 920 and an air recirculation duct 924 as shown in FIG. 13. The annular case 920 is configured to support the fan track liner at a radial position relative to the axis 11 of the gas turbine engine 110. The air recirculation duct 924 includes extraction ports 960A, 960B, a manifold 962, and an injection port 964 as shown in FIG. 12.

The extraction ports 960A, 960B and the injection port 964 are in fluid communication with the gas path 18 of the gas turbine engine 110, while the manifold 962 is in fluid communication with the extraction ports 960A, 960B and the injection port 964. The manifold 962 extends between the extraction ports 960A, 960B and the injection port 964 so that the two extraction ports 960A, 960B feed the single injection port 964.

In the illustrative embodiment, the air recirculation duct 924 includes two extraction ports 960A, 960B that feed the one injection port 964 as shown in FIG. 13. The second extraction port 960B is spaced apart circumferentially from the first extraction port 960B. In other embodiments, the air recirculation duct 924 may have more than two extraction ports 960A, 960B that feed the one injection port 964.

In the illustrative embodiment, the injection port 964 is circumferentially between the first extraction port 960A and the second extraction port 960B as shown in FIG. 13. The manifold 962 extends between the injection port 964 and the first and second extraction ports 960A, 960B.

The manifold 962 includes a central duct 963 and a plurality of conduits 965, 967, 969 that extend from the central duct 963 to one of the ports 960A, 960B, 964 as shown in FIG. 13. The central duct 963 is arranged axially between the extraction ports 960A, 960B and the injection port 964. The first conduit 965 extends axially forward from the first extraction port 960A to the central duct 963. The second conduit 967 extends axially forward from the second extraction port 960B to the central duct 963. The third conduit 969 extends axially aft from the injection port 964 to the central duct 963.

A portion of the gases from the gas path 18 flows into the extraction ports 960A, 960B and the corresponding conduits 965, 967 direct the portion of gases to the central duct 963. Then the combined flows are flow through the third conduit 969 to the injection port 964. The combined flow is then injected back into the gas path 18 axially forward of the forward end of the fan track liner.

The present application relates to tip injection or air recirculation in the fan 112 in the gas turbine engine 110. Typically, tip injection may be used in a compressor to increase stall margin of the compressor. However, integrating air recirculation into the fan 112 causes some design difficulties because the fan 112 has complex systems for fan blade containment that may be problematic to work around.

In the illustrative embodiment, the fan case assembly 10 has an air recirculation duct 24 integrated for the tip injection through specific zones 54, 56, 58 of the fan case 20, which would permit the case 20 to remain structurally sound for containing the blades 14. The containment hook 40 located in front of the rotor may allow for injection ahead of the hook 40. Injection ahead of the hook 40 protects the injection port 64. Likewise, the flange 42 may provide some shielding for the extraction port 60 at the aft end 32 of the fan track liner 22. This avoids holes in the main containment region of the case 20 where strains are high, while still allowing for incorporation of tip injection recirculation.

The case 20 may allow the air recirculation duct 24 to be installed through the containment case 20 without the loss of its structural integrity. To provide sufficient recirculation flow without disrupting aspects of the containment system functionality, off-takes, or extraction ports 60, may be located behind the fan track liner 22 by the flange 42 and connected via the conduit 62 to the injection ports 64 ahead of the containment hook 40.

In the illustrative embodiment, the fan track liner 22 extends to accommodate the extent of high energy ice shedding. The fan track liner 22 includes an extent of margin before the rear acoustic panel 28 begins. This usually includes a gap that is filled with sealant; however, the extraction port 60 extends through the case 20 and opens at this location. With this particular configuration, the port 60 might be forward or aft of the flange 42 depending on the particular engine size, fan case design, and its strains predicted during fan blade out simulation.

In some embodiments, the aft end 32 of the fan track liner 22 may have castellated regions to allow for the extraction ports 60 to be forward of the flange 42. In other embodiments, the forward end 90 of the acoustic panel 28 may have cut sections out between its fasteners so that the port 64 is aft of the flange 42. This would allow the conduit 62 to be run to the injection port 64 radially outward of the case 20.

The particular size and count of the air recirculation ducts 24 may be tailored to a specific fan size and stall margin improvement for the gas turbine engine 110. This is due to the fact that changes in recirculation flow can modify the stall margin and this is correlated with the flow of the fan overall. Therefore, larger ports or a higher count may be used for different sized fans.

In the illustrative embodiment, the extraction port 60 is flush to flow path 18. The extraction port 60 also includes a valve 86. The valve 86 includes a scoop or flap 88 to increase flow into the extraction port 60. The flap 86 may extend across the opening 76 to block flow when additional stall is not desired and efficiency debit is to be minimized. The flap 88 could pivot from a closed position to an open position to help recover more flow/pressure into the channelway. In some embodiments, the valve 86 may be a butterfly valve or similar to block flow into the extraction port when system is not on.

In some embodiments, the air recirculation ducts 24 may be aligned with cut-outs in the panel. One may have 8-off rear acoustic panels with an extraction port in the middle of each and then have 4-off front acoustic panels, each with two injection passages through them. Alternatively, there could be 6-off rear acoustic panels with two cut-outs for extraction each and 4-off with three passages for injection on each. Alternatively there may be 12-off extraction ports and 6-off injection ports, as suggested by FIG. 13.

While the injection may not be equally distributed, it does make sense for packaging to use repeating patterns in the liner definitions. Additionally, it may be beneficial for the flange to be scalloped to ensure there is adequate support to bolt brackets in order to hold the duct 24. The duct 24 may be 1.5 inches in diameter or so to reduce pressure losses through it but manifolds may be used to transfer from a circumferentially wide and axially narrow port to a straight circular pipe and then back to the injector which would be axially narrow and then circumferentially wide.

The position of the hook for example may be a percentage of the blade axial chord while the tip injection would be more forward of the rotor leading edge than typically used for tip injection, but still within a greater percentage of the blade axial chord. If the hook was made shorter (by use of tabs to attach the forward flange of the fan track liner) and no forward projection 46 was included at the forward acoustic panel then the distance from injection to rotor leading edge can be minimized. Additionally, the example cross-section uses a high-airfoil count rotor, which for a lower count would have a longer chord and therefore the distance from injection to rotor leading edge would be reduced as fraction of the blade axial chord.

For small and medium engines, there are particular regions of the fan case 20 that would be more conducive to creating holes for tip injection ports and passages. These are generally just ahead of the containment hook 40 and around the flange 42. Therefore, for small and medium engines, holes for the extraction port 60 may be past 75 percent between the hook 40 and the flange 42. Likewise, the first 25 percent of the case 20 would be acceptable for making a passage for the injection port 64.

The resulting fan case assembly 10 provides effective integration of a system capable of improving stall margin by incorporating extraction and injection ports 60, 64 in zones that would permit passage through the case 20 without significantly compromising the integrity of the containment function of the case 20. In some embodiments, circular cross-section duct 24 may be used. In other embodiments, oval-shaped circumferentially wide but radially short ducts 24 may be.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case assembly adapted for use with a gas turbine engine, the fan case assembly comprising:
   a fan track liner that extends circumferentially at least partway about a central axis of the gas turbine engine, the fan track liner including a forward end, an aft end spaced apart axially from the forward end, and an inner radial surface that extends between the forward end and the aft end to define a gas path of the gas turbine engine,
   an annular case coupled with the fan track liner to support the fan track liner radially in the gas turbine engine, and
   an air recirculation duct configured to direct a portion of gases flowing through the gas path of the gas turbine engine from the aft end of the fan track liner into the gas path axially forward of the forward end of the fan track liner, the air recirculation duct including
   extraction ports spaced apart circumferentially about the central axis and in fluid communication with the gas path of the gas turbine engine, each of the extraction ports extending radially through the annular case at a location axially aft of and adjacent to the aft end of the fan track liner, and each of the extraction ports opens directly into the gas path exposed to the fan track liner,
   a first injection port in fluid communication with the gas path of the gas turbine engine, the first injection port extending radially through the annular case at a location axially forward of the forward end of the fan track liner, and the first injection port opens directly into the gas path exposed to the fan track liner, and
   a manifold located radially outward of the annular case and in fluid communication with the extraction ports and the first injection port so that the portion of gases from the aft end of the fan track liner from the extraction ports is directed to the first injection port and into the gas path axially forward of the fan track liner, wherein the annular case includes an outer wall that extends circumferentially around the central axis of the gas turbine engine, the outer wall formed to define aft holes spaced apart circumferentially about the central axis that each extend radially through the entire outer wall and a forward hole that extends radially through the entire outer wall at a location axially forward of the aft holes, and wherein each of the extraction ports extends through one of the aft holes and the first injection port extends through the forward hole.

2. The fan case assembly of claim 1, wherein the air recirculation duct includes a second injection port spaced apart circumferentially from the first injection port and the manifold is in fluid communication with the extraction ports, the first injection port, and the second injection port so that the portion of gases from the aft end of the fan track liner from the extraction ports is directed to both the first injection port and the second injection port.

3. The fan case assembly of claim 2, wherein the first injection port is circumferentially aligned with a first extraction port, the second injection port is circumferentially aligned with a second extraction port, and the manifold extends circumferentially at least partway about the axis.

4. The fan case assembly of claim 3, wherein the manifold includes a first conduit that extends axially between the first injection port and the first extraction port, a second conduit that extends axially between the second injection port and the second extraction port, and an interconnecting conduit that extends circumferentially at least partway between the first conduit and the second conduit.

5. The fan case assembly of claim 1, wherein the annular case further includes a hook that extends radially inward from the outer wall and a flange that extends radially outward from the outer wall axially aft of the hook, and wherein the extraction ports of the air recirculation duct extend through the outer wall axially aft of the flange.

6. The fan case assembly of claim 5, wherein the manifold of the air recirculation duct is located radially outward of the flange of the annular case and the flange of the annular case engages the manifold to support the air recirculation duct relative to the annular case.

7. The fan case assembly of claim 1, further comprising a first valve coupled to a first extraction port of the air recirculation duct, a second valve coupled to a second extraction port of the air recirculation duct, and the first and second valves are configured to vary a flow of gases through the first and second extraction ports.

8. A fan case assembly adapted for use in a gas turbine engine, the fan case assembly comprising:

a fan track liner that extends circumferentially at least partway about a central axis to define a portion of a gas path, the fan track liner including a forward end and an aft end spaced apart axially from the forward end, an annular case coupled with the fan track liner, and an air recirculation duct including extraction ports spaced circumferentially about the central axis and in fluid communication with the gas path, each of the extraction ports extending radially through the annular case near the aft end of the fan track liner, and each of the extraction ports opens directly into the gas path exposed to the fan track liner, a first injection port in fluid communication with the gas path, the first injection port extending radially through the annular case near the forward end of the fan track liner, and the first injection port opens directly into the gas path exposed to the fan track liner, and a manifold in fluid communication with the extraction ports and the first injection port that extends from the extraction ports to the first injection port and the manifold is located radially outward of the annular case, wherein the annular case includes an outer wall that extends circumferentially around the central axis of the gas turbine engine, the outer wall formed to define aft holes spaced apart circumferentially about the central axis that each extend radially through the entire outer wall and a forward hole that extends radially through the entire outer wall at a location axially forward of the aft holes, and wherein each of the extraction ports extends through one of the aft holes and the first injection port extends through the forward hole.

9. The fan case assembly of claim 8, wherein the air recirculation duct includes a second injection port spaced apart circumferentially from the first injection port and the manifold is in fluid communication with the extraction ports, the first injection port, and the second injection port.

10. The fan case assembly of claim 9, wherein the first injection port is circumferentially aligned with a first extraction port and the second injection port is circumferentially aligned with a second extraction port and the manifold extends circumferentially about the axis.

11. The fan case assembly of claim 10, wherein the manifold includes a first conduit that extends axially between the first injection port and the first extraction port, a second conduit that extends axially between the second injection port and the second extraction port, and an interconnecting conduit that extends circumferentially at least partway between the first conduit and the second conduit.

12. The fan case assembly of claim 8, wherein the annular case further includes a hook that extends radially inward from the outer wall and a flange that extends radially outward from the outer wall axially aft of the hook, and wherein the extraction ports of the air recirculation duct extend through the outer wall axially aft of the flange.

* * * * *